US009927299B2

(12) United States Patent
Learmonth et al.

(10) Patent No.: US 9,927,299 B2
(45) Date of Patent: Mar. 27, 2018

(54) SPECTRAL READING USING SYNCHRONIZED LED SOURCES

(71) Applicant: TruTag Technologies, Inc., Kapolei, HI (US)

(72) Inventors: Timothy Learmonth, Berkeley, CA (US); Hod Finkelstein, Berkeley, CA (US)

(73) Assignee: TruTag Technologies, Inc., Kapolei, HI (US)

( * ) Notice: Subject to any disclaimer, the term of this patent is extended or adjusted under 35 U.S.C. 154(b) by 0 days.

(21) Appl. No.: 15/377,772

(22) Filed: Dec. 13, 2016

(65) Prior Publication Data
US 2017/0167919 A1 Jun. 15, 2017

Related U.S. Application Data

(60) Provisional application No. 62/267,753, filed on Dec. 15, 2015.

(51) Int. Cl.
G01J 3/02 (2006.01)
G01J 3/26 (2006.01)
G01J 3/10 (2006.01)
H05B 33/08 (2006.01)

(52) U.S. Cl.
CPC ............... *G01J 3/26* (2013.01); *G01J 3/027* (2013.01); *G01J 3/0275* (2013.01); *G01J 3/10* (2013.01); *G01J 3/108* (2013.01); *H05B 33/0857* (2013.01); *G01J 2003/106* (2013.01)

(58) Field of Classification Search
None
See application file for complete search history.

(56) References Cited

U.S. PATENT DOCUMENTS

| 7,242,509 | B2 | 7/2007 | Atia et al. | |
| 2006/0164095 | A1 | 7/2006 | Jalonen | |
| 2010/0010325 | A1 | 1/2010 | Ridder | |
| 2010/0245832 | A1* | 9/2010 | Saari | G01J 3/02 356/454 |
| 2011/0228279 | A1 | 9/2011 | Lucey | |
| 2011/0303746 | A1* | 12/2011 | Learmonth | G01N 21/3563 235/380 |
| 2014/0293091 | A1* | 10/2014 | Rhoads | G01J 3/513 348/234 |

* cited by examiner

Primary Examiner — Jonathan Hansen
(74) Attorney, Agent, or Firm — Van Pelt, Yi & James LLP

(57) ABSTRACT

A system for spectral reading includes a plurality of LEDs, an interface, and a processor. The plurality of LEDs are disposed in a physical array. Light from the plurality of LEDs is enabled to be collimated at a Fabry-Perot etalon. The interface is configured to receive a gap calibration table and power characteristics of a plurality of LEDs. The processor is configured to determine an LED switch table. The LED switch table indicates a set of the plurality of LEDs with power above a threshold at a plurality of wavelengths. The processor is further configured to cause measurement of a sample using the gap calibration table and the LED switch table for a set of gap values and determine measurement results.

20 Claims, 24 Drawing Sheets

1100

Gap Calibration Table

| Gap | First Spectral Peak Wavelength | Second Spectral Peak Wavelength | Third Spectral Peak Wavelength |
|---|---|---|---|
| 1.0 μm | 350 nm | 405 nm | 455 nm |
| 1.1 μm | 360 nm | 417 nm | 469 nm |
| 1.2 μm | 370 nm | 429 nm | 483 nm |
| 1.3 μm | 380 nm | 441 nm | 497 nm |
| 1.4 μm | 390 nm | 453 nm | 511 nm |
| 1.5 μm | 400 nm | 465 nm | 525 nm |
| 1.6 μm | 410 nm | 477 nm | 539 nm |
| 1.7 μm | 420 nm | 489 nm | 553 nm |
| 1.8 μm | 430 nm | 501 nm | 567 nm |

| LED Switch Table | LED 1 On? | LED 1 Power Output | LED 2 On? | LED 2 Power Output | LED 3 On? | LED 3 Power Output |
|---|---|---|---|---|---|---|
| 400 nm | No | | No | | No | |
| 410 nm | No | | No | | No | |
| 420 nm | No | | Yes | 9.1 W | No | |
| 430 nm | No | | Yes | 9.9 W | No | |
| 440 nm | No | | Yes | 8.7 W | No | |
| 450 nm | No | | No | | No | |
| 460 nm | No | | No | | Yes | 8.6 W |
| 470 nm | Yes | 9.5 W | No | | Yes | 8.7 W |
| 480 nm | Yes | 10.2 W | No | | No | |
| 490 nm | Yes | 9.7 W | No | | No | |
| 500 nm | No | | No | | No | |
| 510 nm | No | | No | | No | |
| 520 nm | No | | No | | No | |

Fig. 13

SPECTRAL READING USING SYNCHRONIZED LED SOURCES

CROSS REFERENCE TO OTHER APPLICATIONS

This application claims priority to U.S. Provisional Patent Application No. 62/267,753 entitled SPECTRAL READING USING SYNCHRONIZED LED SOURCES filed Dec. 15, 2015 which is incorporated herein by reference for all purposes.

BACKGROUND OF THE INVENTION

A reader is used to measure a reflected optical spectrum from objects. In order to produce a strong reflected signal, a bright incident light is used. This poses a problem when a portable reader is desired because the power requirements (e.g., those due to the powering of the bright incident light) of the reader's operations must be satisfied using a battery. In addition, the portable reader typically needs to operate for a minimum time (e.g., 8 hours of operation) and still meet portability requirements (e.g., a maximum weight), which set limits on the amount of power that the bright incident light can consume.

BRIEF DESCRIPTION OF THE DRAWINGS

Various embodiments of the invention are disclosed in the following detailed description and the accompanying drawings.

FIG. 11 is a diagram illustrating an embodiment of a gap calibration table.

FIG. 13 is a diagram illustrating an embodiment of an LED switch table.

DETAILED DESCRIPTION

Figure 1:
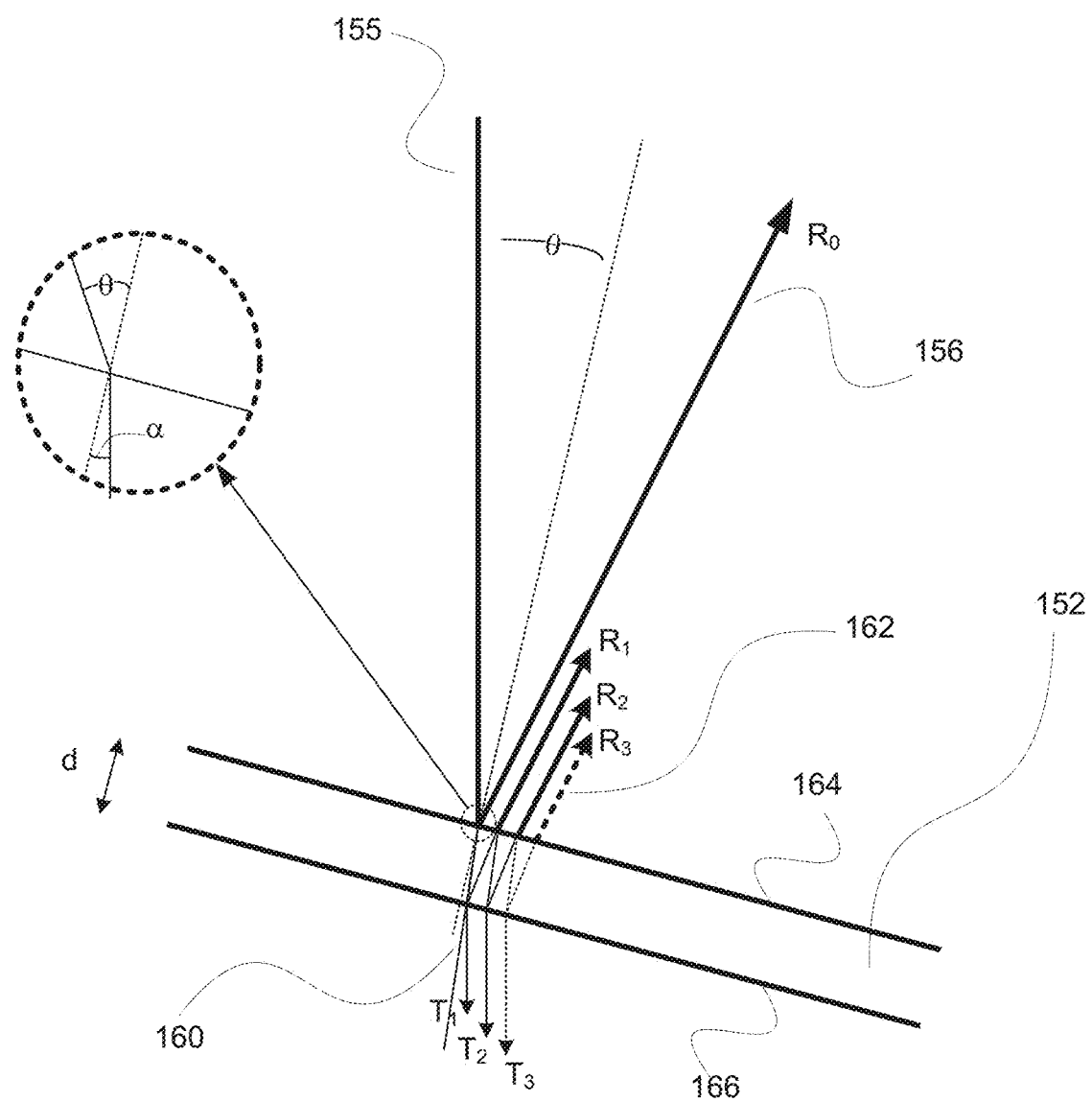
FIG. 1 is a diagram illustrating an embodiment of a tunable Fabry-Perot etalon.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for spectral reading is disclosed. The system comprises a plurality of LEDs, an interface, and a processor.

The plurality of LEDs are disposed in a physical array. Light from the plurality of LEDs is enabled to be collimated at a Fabry-Perot etalon. The interface is configured to receive a gap calibration table and power characteristics of a plurality of LEDs. The processor is configured to determine an LED switch table. The LED switch table indicates a set of the plurality of LEDs with power above a threshold at a plurality of wavelengths. The processor is further configured to cause measurement of a sample using the gap calibration table and the LED switch table for a set of gap values and determine measurement results.

In some embodiments, the system for spectral measurement includes a lens for collecting light from the sample with a good working distance and field of view (e.g., ~10 mm diameter field of view, 1×objective lens with numeric aperture (NA) of ~0.05-0.07, and working distance of ~3-7 mm). In some embodiments, the objective lens will be operated in a telecentric arrangement to ensure that the system captures tilted objects away from the optical axis.

In some embodiments, lenses in the system for spectral measurement are present to separate the NA of the tunable Fabry-Perot etalon from the NA of the rest of the system. The system has a low NA at the tunable Fabry-Perot etalon to avoid smearing the interferogram due to light traveling through the etalon at many different angles. In some embodiments, all the lenses are broadband—there is no need for filtering the light with the exception of the tunable Fabry-Perot etalon. In some embodiments, the light reaching the detector is bandpass filtered: either by sequentially illuminating with band limited sources, or by placing a series of bandpass filters between the source and the target object, or by placing a set of filters in the reflected path between the object and the detector or by utilizing a set of filters on the detector itself, or using a combination of the above. In various embodiments, the tunable Fabry-Perot etalon is made of silver coated fused silica, glass or another dielectric, or any other appropriate material. In some embodiments, the outer surfaces of the tunable Fabry-Perot etalon are anti-reflection coated. Scan range of the tunable Fabry-Perot etalon may be tuned from a smallest achievable gap before the plates stick together (e.g., ~500 nm or less) to a gap at which a coherent signal is no longer present (e.g., ~40 um). Depending on the tunable Fabry-Perot etalon finesse, signal processing for the system varies:

a. low finesse tunable Fabry-Perot etalon-after background compensation and optional localization of target object, take a windowed Fourier transform of the interferogram to obtain a target object spectrum.
b. medium finesse tunable Fabry-Perot etalon-after background compensation and optional localization of target object, take a Fourier transform; although the spectrum contains features, deal with the presence of the features rather than try to deconvolve them.
c. high finesse tunable Fabry-Perot etalon-after background compensation and optional localization of target object, record the images of transmitted light, determine the relative contribution of interference orders by deconvolving with known RGB color filter response as is known in the art, and continue until all wavelength bands are covered.

FIG. 1 is a diagram illustrating an embodiment of a tunable Fabry-Perot etalon. In the example shown, the heart of the tunable Fabry-Pérot etalon (e.g., etalon 152) is a pair of partially reflective surfaces (e.g., surface 164 and surface 166) spaced hundreds of nanometers to centimeters apart (e.g., d). Light is incident at an angle θ to the normal of surface 164. The first reflection 156 is $R_0$. Within etalon 152 light travels at angle α to the normal of surface 166 (see also close up). The varying transmission function of the etalon is caused by interference of the multiple reflections of light between the two reflecting surfaces, producing transmitted beams 160 ($T_1$, $T_2$, $T_3$, etc.) and reflected beams 162 ($R_1$, $R_2$, $R_3$, etc.). Constructive interference occurs if the transmitted beams are in phase, corresponding to a high-transmission peak of the etalon. If the transmitted beams are out-of-phase, destructive interference occurs corresponding to a transmission minimum. Whether the multiple reflected beams are in phase or not depends on the wavelength (λ) of the light, the angle the light travels through the etalon (α), and the tunable local thickness of the etalon (d). In the equations below, the plates are separated by a space with a refractive index n (e.g., for air n=1) and the propagation of light into the plates is negligible or independent of wavelength. The phase difference between each successive transmitted pair (e.g., $T_2$-$T_1$) is given by δ:

$$\delta = (2\pi/\lambda) 2\, n\, d \cos \alpha$$

If both surfaces have a reflectance R, the transmittance function of the etalon is given by:

$$T_e = \frac{(1-R)^2}{1+R^2-2R\cos\delta} = \frac{1}{1+F\sin^2(\delta/2)},$$

where the coefficient of finesse (F) is $$F = \frac{4R}{(1-R)^2}$$

Figure 2A:
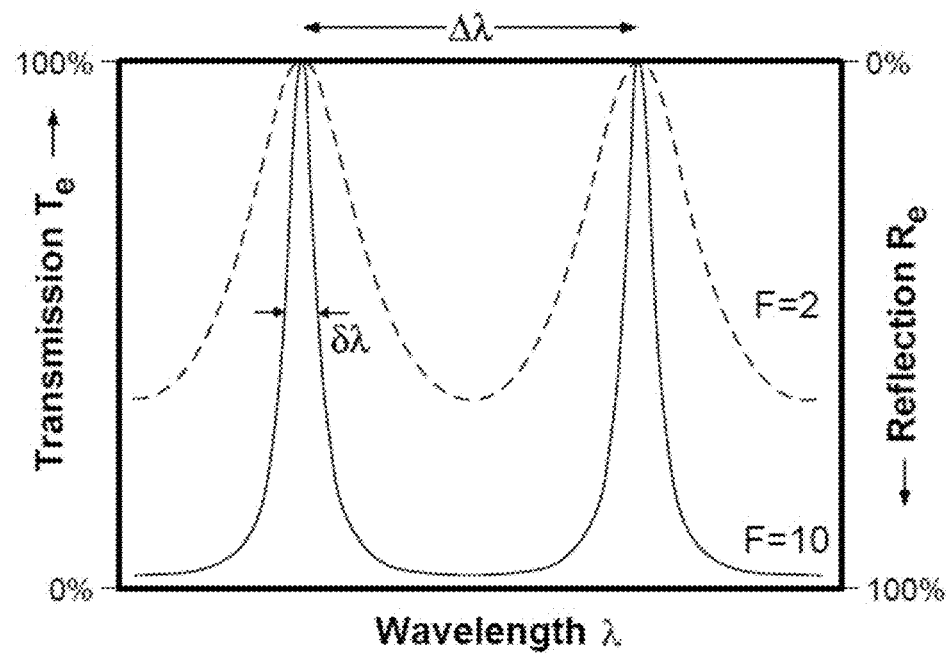
FIG. 2A is a graph illustrating an embodiment of the transmission of an etalon.

FIG. 2A is a graph illustrating an embodiment of the transmission of an etalon. In some embodiments, transmission of etalon of FIG. 2A is associated with etalon 152 of FIG. 1. In the example shown, maximum transmission of the etalon ($T_e$=1) occurs when the optical path length difference, 2nd cos α, between each transmitted beam is an integer multiple of the wavelength (λ). In the absence of absorption, the reflectance of the etalon $R_e$ is the complement of the transmittance, such that $T_e + R_e = 1$. The maximum reflectivity is given by:

$$R_{max} = 1 - \frac{1}{1+F} = \frac{4R}{(1+R)^2}$$

and this occurs when the path-length difference is equal to half an odd multiple of the wavelength. A high-finesse etalon (F=10) shows sharper peaks and lower transmission minima than a low-finesse etalon (F=2). The wavelength separation between adjacent transmission peaks is called the free spectral range (FSR) of the etalon, Δλ, and is given by:

$$\Delta\lambda = \lambda_0^2 / (2\, n\, d \cos \alpha + \lambda_0)$$

where $\lambda_0$ is the central wavelength of the nearest transmission peak. The FSR is related to the full-width half-maximum, δΔ, of any one transmission band by a quantity known as the finesse:

$$\mathcal{F} = \frac{\Delta\lambda}{\delta\lambda} = \frac{\pi}{2\arcsin(1/\sqrt{F})}$$

A tunable Fabry-Pérot etalon is able to adjust the distance d between the reflective surfaces in order to change the wavelengths at which transmission peaks occur in the etalon. Due to the angular dependence of the transmission, the peaks can also be shifted by rotating the etalon with respect to the beam or if the beam enters the etalon at an angle. In the latter case, the transmitted wavelengths will shift by the cosine of its angle with the plates. This result is important because it means that if light is not well collimated as it enters the etalon, the transmission peaks will be broadened and spectral resolution will be decreased. This angular dependence has different effects depending on the optical configuration in which the etalon is used. In a non-telecentric focal plane case, at each location on the entrance plane to the etalon, rays are entering at a different angle. Therefore, the spectral response at each location will be different, although the effect of plate flatness (i.e., planarity or non-coplanarity) will be reduced. For a given plate separation, multiple wavelengths will be transmitted through the device. For a given Finesse, as the wavelength resolution increases, the FSR decreases.

Figure 2B:
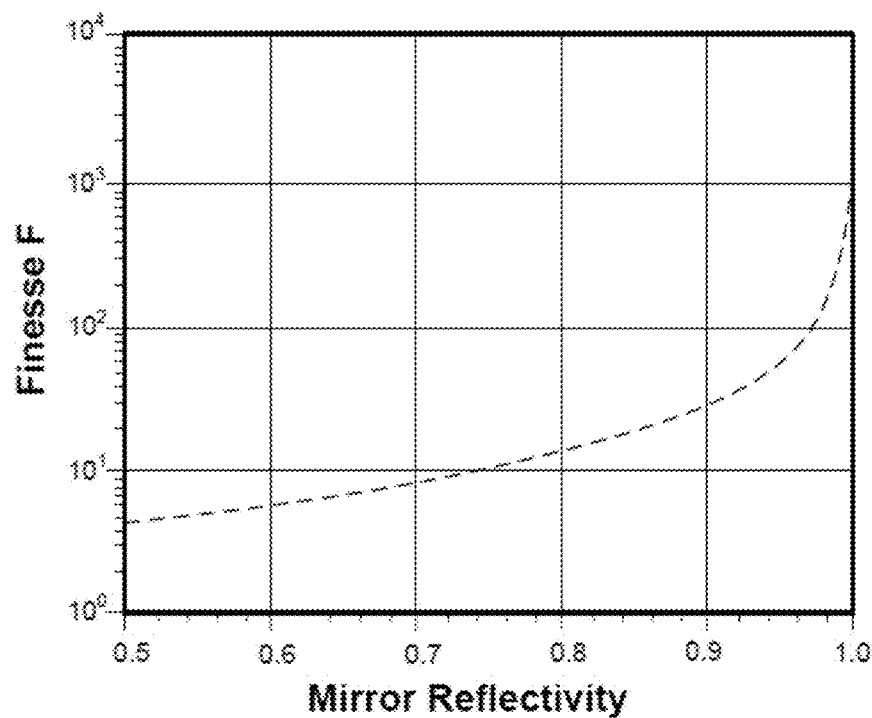
FIG. 2B is a graph illustrating an embodiment of the finesse as a function of the reflectivity of the surfaces of the etalon.

FIG. 2B is a graph illustrating an embodiment of the finesse as a function of the reflectivity of the surfaces of the etalon. In some embodiments, finesse of etalon of FIG. 2B is associated with etalon 152 of FIG. 1. In the example shown, high finesse factors correspond to high reflectivity of the etalon surfaces.

Figure 3:
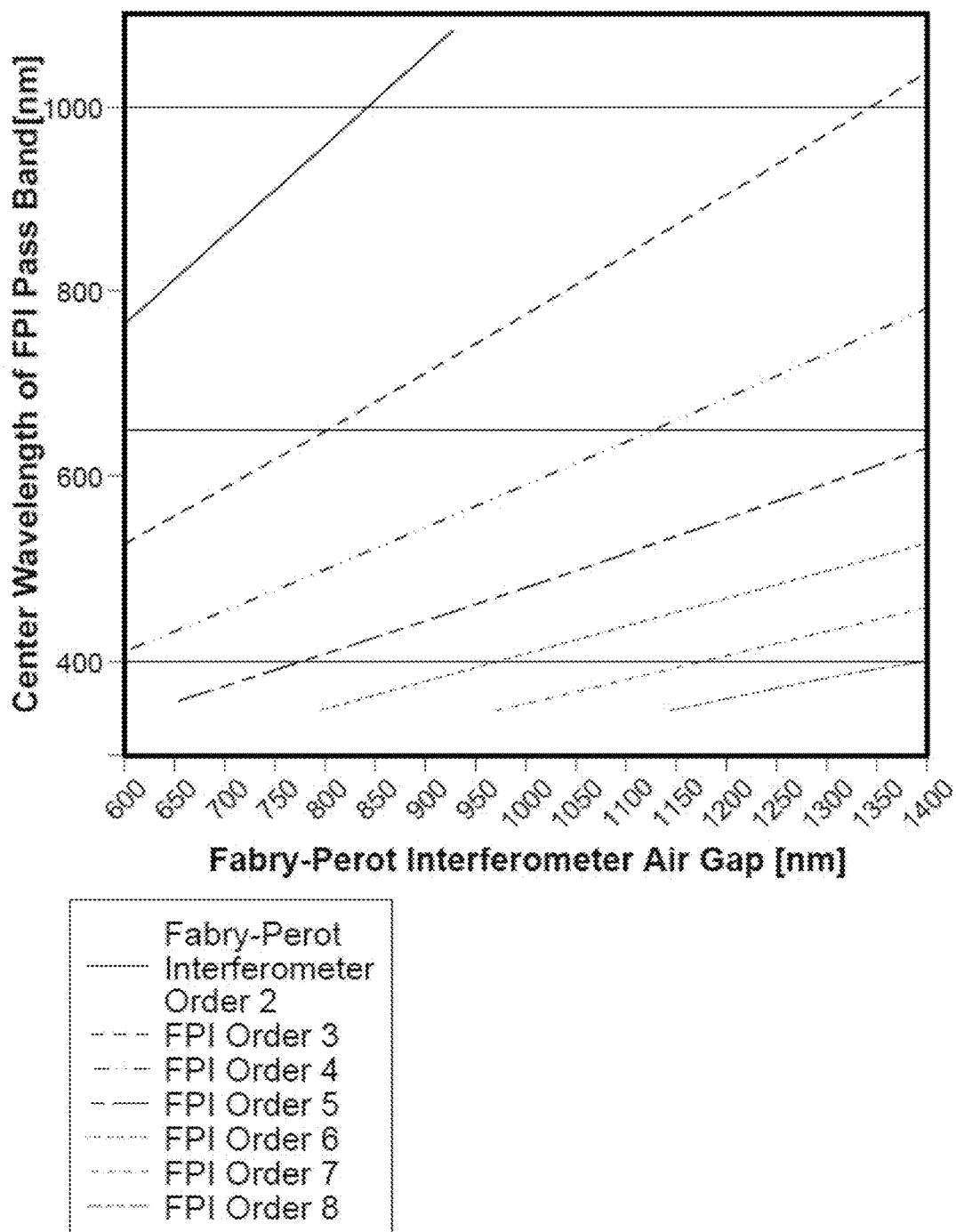
FIG. 3 is a graph illustrating an embodiment of center wavelength transmitted through a tunable Fabry-Perot etalon for different gaps between the surfaces.

FIG. 3 is a graph illustrating an embodiment of center wavelength transmitted through a tunable Fabry-Perot etalon for different gaps between the surfaces. In some embodiments, pass band of etalon of FIG. 3 is associated with etalon 152 of FIG. 1. In the example shown, for a given plate separation, multiple wavelengths will be transmitted through the device. In some embodiments, inserting a bandpass filter ensures that wavelengths from only one interference pattern enter the tunable Fabry-Perot etalon. By using different bandpass filters, different orders through the tunable Fabry-Perot etalon can be identified. For example, using a multispectral image sensor at the exit of the tunable Fabry-Perot etalon one can deduce which harmonics were transmitted by looking at the relative amplitude of light on different pixels.

Figure 4:
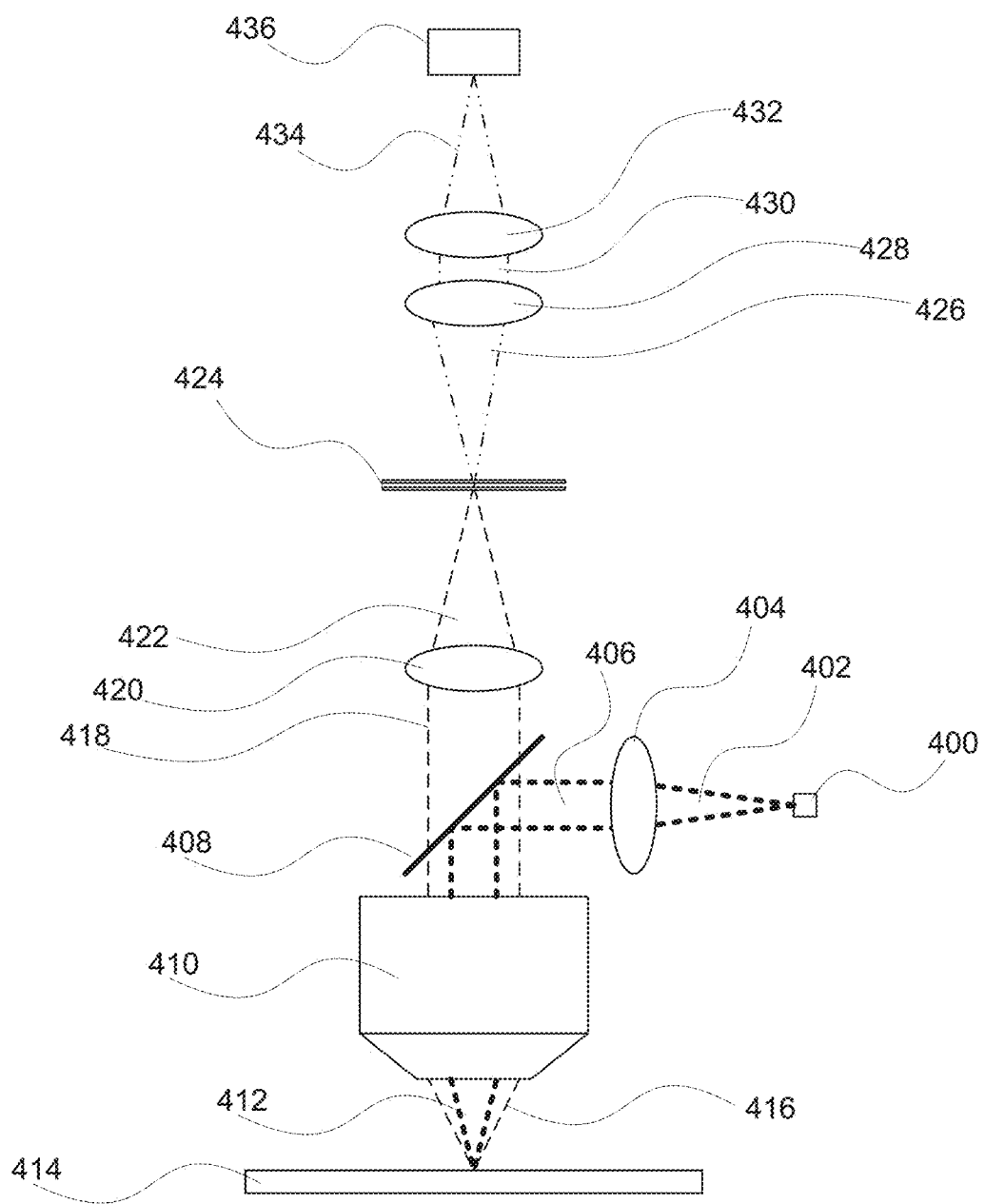
FIG. 4 is a diagram illustrating an embodiment of a system for relative and/or absolute spectral measurement.

FIG. 4 is a diagram illustrating an embodiment of a system for relative and/or absolute spectral measurement. In some embodiments, system of FIG. 4 uses an etalon (e.g., etalon 152 of FIG. 1). In the example shown, source 400 provides broadband illumination to sample sitting on or in substrate 414. For example, source 400 comprises a plurality of light emitting diodes each with a range of frequencies. Light from source 400 propagates along path 402 and is collimated using lens 404. Light propagates along path 406 and at least a portion is reflected by beam splitter 408 through objective 410, travels on path 412, and is focused on sample on substrate 414. Reflected light from sample on sample substrate 414 propagates along path 416. The numerical aperture of incident beam is different from the numerical aperture of the reflected beam (e.g., NA of incident beam is smaller than NA of reflected beam).

In the example shown, reflected light from sample is collimated and propagates along 418 with at least a portion of the beam transmitting through beam splitter 408. The reflected light is focused using lens 420 to focus on tunable Fabry-Perot etalon 424 on path 422. For example, the reflected light of the sample is imaged onto the tunable Fabry-Perot etalon (e.g., tunable Fabry-Perot etalon 424). The transmitted light through tunable Fabry-Perot etalon 424 propagates along path 426 to lens 428 and lens 432 so that the transmitted light propagates along path 430 and path 434. Transmitted light is focused on detector 436. For example, the filtered reflected light from the sample is imaged onto the detector (e.g., detector 436). Detector 436, tunable Fabry-Perot etalon 424, and sample on sample substrate 414 are each optically at the same point (e.g., telecentric). In some embodiments, detector 436 and tunable Fabry-Perot etalon 424 are separated by imaging optics (e.g., one or more lenses).

In some embodiments, a sample comprises a spectral target, wherein the spectral target reflects or transmits selectively a set of wavelengths (e.g., fluorescent labels, optical filters, rugate tags, etc.).

In some embodiments, a multispectral sensor is used.

In some embodiments, a monochrome sensor is used. If a monochrome sensor is used, then either the LEDs and filters (outside the FPI) are selected such that only a single order is transmitted during each image acquisition, or an algorithm is implemented if a higher order wavelength has been transmitted. In the latter case, the resultant ambiguity is resolved by sampling the same wavelength at a different FPI gap and processing the relative detected intensities to derive the presence and relative contributions of the various transmitted orders.

In some embodiments, the light reaching the detector is bandpass filtered: either by sequentially illuminating with band limited sources, or by placing a series of bandpass filters between the source and the tagged object, or by placing a set of filters in the reflected path between the object and the detector or by utilizing a set of filters on the detector itself, or using a combination of the above. For a given plate separation, multiple wavelengths will be transmitted through the device. In some embodiments inserting a bandpass filter ensures that wavelengths from only one interference pattern enter the Fabry-Perot etalon. By using different bandpass filters, different orders through the Fabry-Perot etalon can be identified. For example, using a multispectral image sensor at the exit of the Fabry-Perot etalon, such that by looking at the relative amplitude of light on different pixels, one can deduce which harmonics were transmitted through the Fabry-Perot etalon. In some embodiments, two Fabry-Perot etalons are used in series to isolate one order—the first having a low finesse and acting as a bandpass filter to select a limited band of light, narrower than the FSR of the second Fabry-Perot etalon, which has a high Finesse (low FWHM with narrow FSR).

Figure 5:
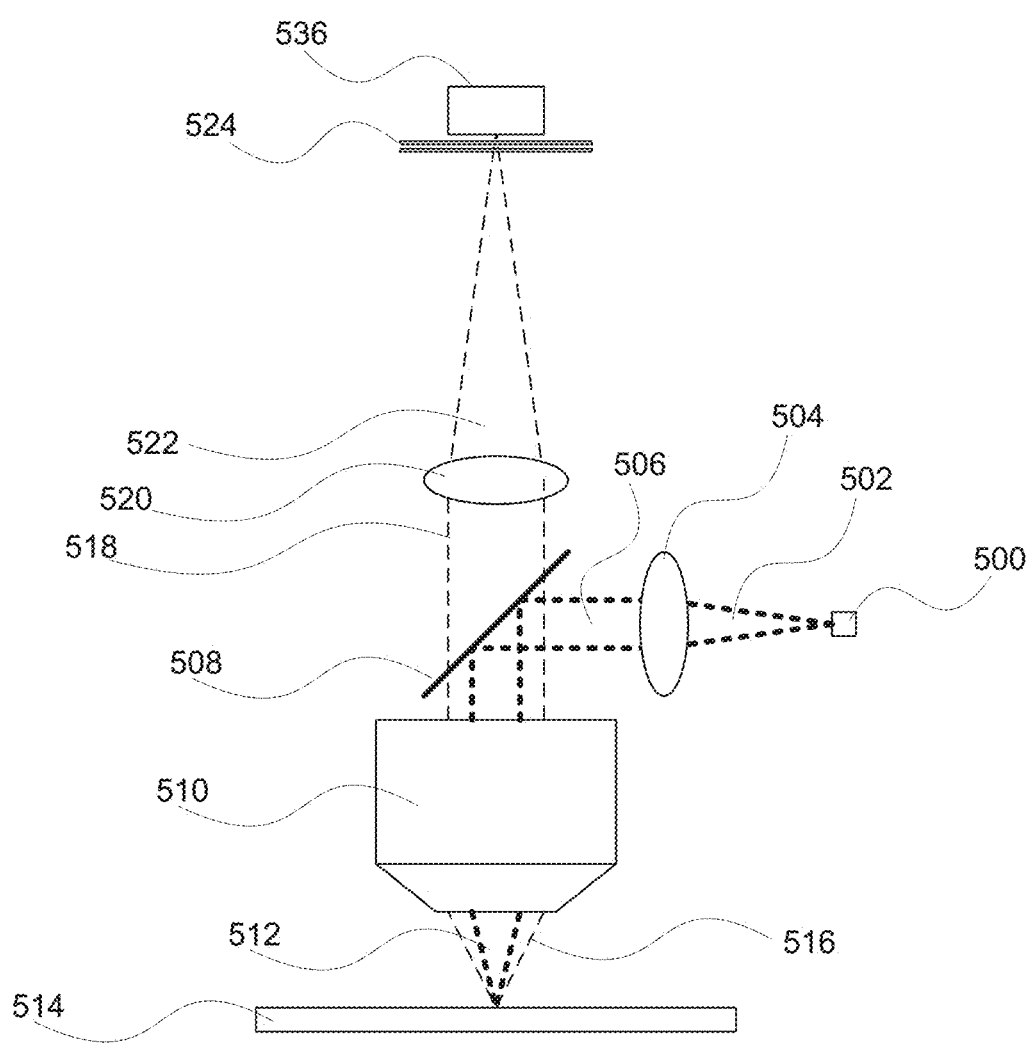
FIG. 5 is a diagram illustrating an embodiment of a system for relative and/or absolute spectral measurement.

FIG. 5 is a diagram illustrating an embodiment of a system for relative and/or absolute spectral measurement. In some embodiments, system of FIG. 5 uses an etalon (e.g., etalon 152 of FIG. 1). In the example shown, source 500 provides broadband illumination to sample sitting on or in substrate 514. For example, source 500 comprises a plurality of light emitting diodes each with a range of frequencies. Light from source 500 propagates along path 502 and is collimated using lens 504. Light propagates along path 506 and at least a portion is reflected by beam splitter 508 through objective 510, travels on path 512, and is focused on sample on substrate 514. Reflected light from sample on sample substrate 514 propagates along path 516. Numerical aperture of incident beam is different from the numerical aperture of the reflected beam (e.g., NA of incident beam is smaller than NA of reflected beam).

In the example shown, reflected light from sample is collimated and propagates along 518 with at least a portion of the beam transmitted through beam splitter 508. The reflected light is focused using lens 520 onto tunable Fabry-Perot etalon 524 on path 522. The transmitted light through tunable Fabry-Perot etalon 524 propagates directly to detector 536. Detector 536, tunable Fabry-Perot etalon 524, and sample on sample substrate 514 are each optically close to the same point.

In some embodiments, a reader has the following specifications:
Dimensions <45 mm×45 mm×25 mm+the handle
The reader is a hand-held device In some embodiments, the spectral resolution can be achieved because high orders of a tunable Fabry-Perot etalon can be used with multiple LED illumination. As explained above, in case of ambiguity as to which wavelength was recorded on the image sensor for a given gap, a second and possibly additional gaps are scanned to clarify the ambiguity. By processing the intensities detected at those additional gaps, the system infers which wavelengths were sensed, and at what relative intensities.

In some embodiments, the reader includes a memory to store the output of the sensor. In some embodiments, the reader includes a processor to process the data stored in the memory and a controller to synchronize the operation of the tunable Fabry-Perot etalon, camera, and LEDs. In some embodiments, the controller coordinates the gap of the tunable Fabry-Perot etalon and the turning on and off of each of the plurality of LEDs illuminating the sample.

Figure 6:
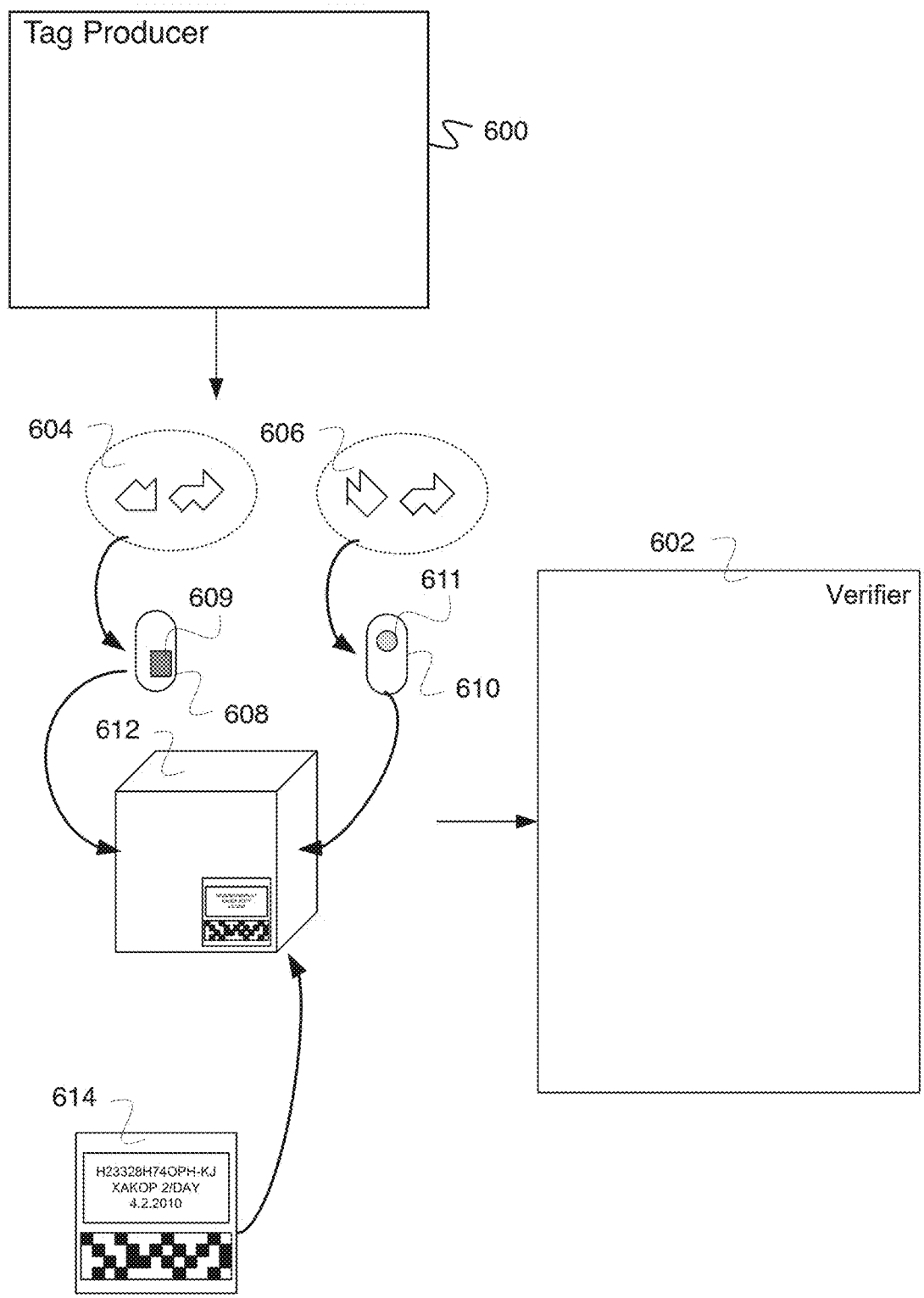
FIG. 6 is a block diagram illustrating an embodiment for a system for verifying an item in a package.

FIG. 6 is a block diagram illustrating an embodiment for a system for verifying an item in a package. In some embodiments, system of FIG. 6 uses an etalon (e.g., etalon 152 of FIG. 1). In the example shown, tag producer 600 produces tags (e.g., tags 604 and tags 606). Tags 604 are placed on item 608 in placement 609. Tags 606 are placed on item 610 in placement 611. In some embodiments, tags 604 and tags 606 are produced in a batch and selected for being associated with each item (e.g., item 608 and item 610). In some embodiments, tags are selected based on a tag shape or a characteristic of a tag shape (e.g., a roughness, a size, a shape, etc.). Items are placed in packaging 612 that includes label 614. In various embodiments, label 614 includes encoded information of one or more of the following: item type, item potency, item name, item stock keeping unit number, spectral response of the tag associated with the item, item shape, tag shape(s), tag placement information, item usage information, or any other appropriate information. Verifier 602 reads tags 604 and tags 606 using a spectral reader. Tag shape and/or tag placement is read using an imager of verifier 602. Verifier 602 verifies the authenticity of package 612 using information on label 614, spectral reading of tags, tag shape and/or tag placement information, or any other appropriate information. Linkages of the information in the label, information encoded in the tag, and information encoded in the placement are formed, so that incorrect components are detected (e.g., any tampering or substitution is detected). In some embodiments, the information regarding the label, the tag, the tag placement, and the items being tagged is stored in a database that can be accessed for later verification of an item and its associated tags.

Figure 7:
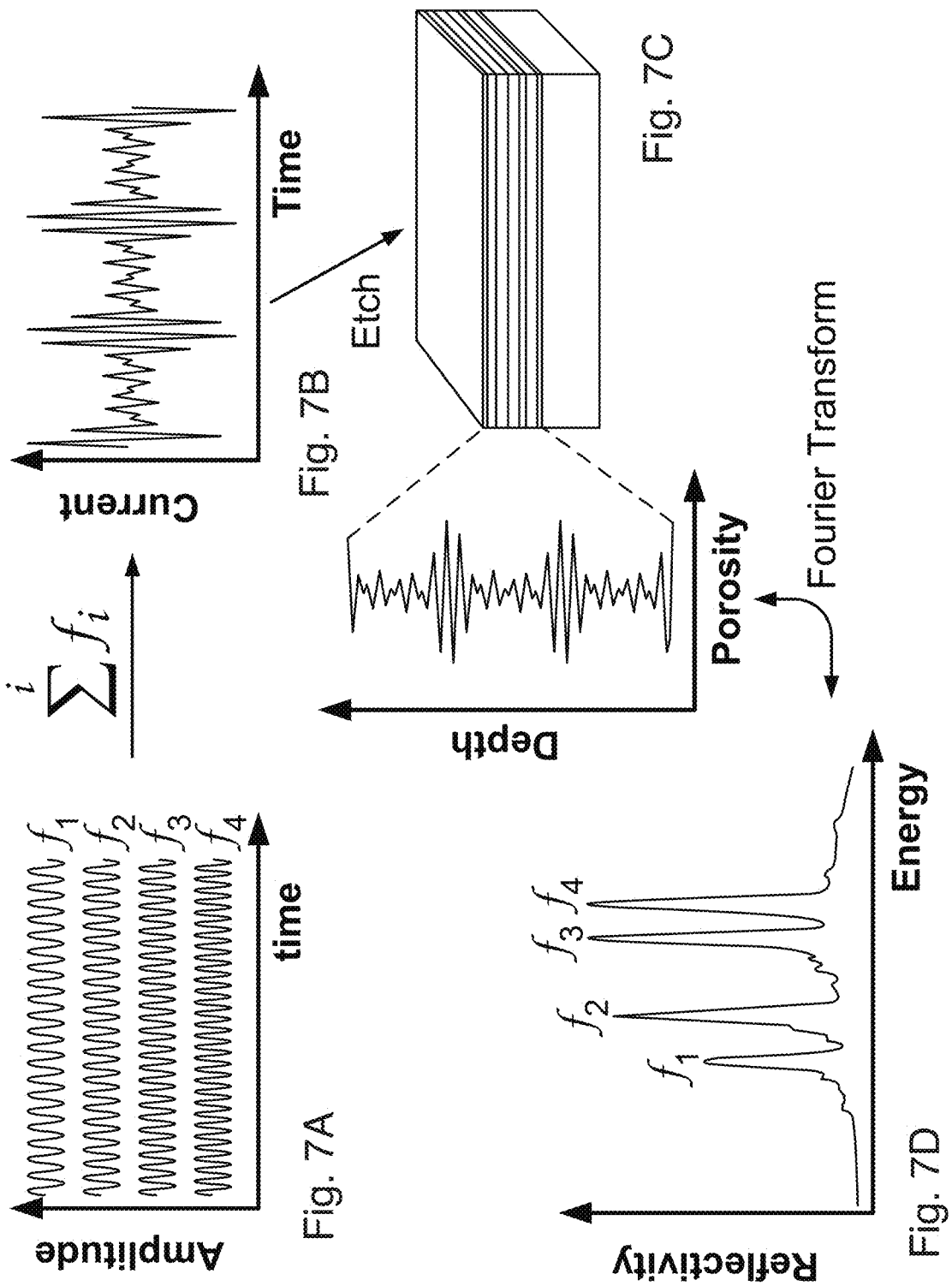
FIG. 7A, FIG. 7B, FIG. 7C, and FIG. 7D form a block diagram illustrating an embodiment of a process for creating a rugate microtag.

FIG. 7A, FIG. 7B, FIG. 7C, and FIG. 7D form a block diagram illustrating an embodiment of a process for creating a rugate microtag. In some embodiments, process of FIG. 7A, FIG. 7B, FIG. 7C, and FIG. 7D is used to create a tag comprising an etalon (e.g., etalon 152 of FIG. 1). In the example shown, a waveform superposition method is used to design a spectral state. Four sine waves with different frequencies are added together to generate a composite waveform that is then converted into a current-time waveform by the computer-controlled current source. FIG. 7A shows sine waves of four frequencies, f1, f2, f3, and f4, with equal amplitudes as a function of time. FIG. 7B shows the sum of the four waves and indicates that this will control current as a function of time. This current-time waveform etches a porosity-depth profile into the Si wafer. FIG. 7C shows an etched silicon wafer with a porosity as a function of depth graph. Analogous to a Fourier transform of the composite waveform, the resulting optical reflectivity spectrum displays the four frequency components of the original four sine waves as separate spectral peaks. FIG. 7D shows an optical reflectivity spectrum showing energy as a function of frequency. The position and intensity of each rugate spectral peak is influenced by the frequency and amplitude, respectively, of its corresponding sine component. Note that the overall spectral shape of the illuminating light source, as well as the bandwidth of the optical components and spectrometer used to measure the reflected or transmitted rugate spectra, also influence the measured reflectivity peak amplitudes. Further, note that increasing the frequency of a given sine component not only increases the energy (or peak position) of a corresponding reflectivity peak, but also results in an increased amplitude of each peak, absent any competing effects from the measuring system. Increasing the amplitude of a given sine component results in an increased amplitude of each spectral peak without affecting its energy (or peak position), absent any competing effects from the measuring system. With a rugate filter, the continuous variation of the refractive index of a material as a function of depth is used to create peaks of strong reflectivity at only specific wavelengths, and generally low reflectivity away from these wavelengths. In the past, rugate filters have been crudely created by depositing successive layers of materials of different index of refraction onto a substrate. This method is limited by the ability to create extremely thin layers, by the availability of suitable materials that can be deposited in these layers, and by the stability of the resulting film against diffusion. Porous silica films overcome all of these limitations by allowing the continuous variation of the index of refraction in a film made of a stable material with no separate components or deposited layers. In addition, the same etching process used to create pores, when employed under certain conditions, is used to separate a film from its parent silicon wafer.

In some embodiments, film creation and separation is realized by anodically etching p-type, boron-doped, (100)-oriented silicon with <1 mΩ cm resistivity in a solution of 48% aqueous HF:ethanol (3:1 by volume). A computer-generated waveform containing the encoding information is used to control the electrochemical reaction. The porous silicon film is lifted off the crystalline silicon substrate using an electropolishing reaction consisting of a 4mA/cm anodic current applied in a solution composition of 48% aqueous HF:ethanol (1:14.5 by volume) for 60 s. The resulting film, as thin as ten microns, is robust enough to require no substrate. The combination of common processing techniques and minimal material usage allows these films to be produced cheaply. Finally, the information in a rugate filter is encoded into the depth of the film, so the film can be divided into numerous small tags (tens of microns in x-y dimensions), each of which is a type of rugate microtag, without any loss of information, further reducing cost.

Porous silica rugate microtags offer a range of advantages over existing product labeling or authentication solutions. The advantages offered by a silica microtag originate in a number of ways. Because an optical spectrometer is required to observe the encoded signal, the barrier to decoding the signal, and even more so reproducing it, is much higher than with a typical UPC (Universal Product Code) barcode.

Layered security schemes utilizing silica microtags attached to, or embedded within, an item to be authenticated, can include both information on the items' packaging (e.g., text, 2D barcodes), and information stored in the tag. The two pieces of information can be combined into a digital signature, such that a security violation would be noted if someone tampers with either the packaging or the item.

Since the microtags are encoded with information purely in their depth, rather than along their surface, they can be broken into pieces with full depth, with each piece still containing all of the encoded information. This makes porous silica microtags suitable for forensic applications, where the tag may be subjected to rough handling. As long as any full-depth piece of the tag can be recovered, the information is not lost. So even after the use and disposal of a product, in all but extreme situations a rugate microtag is expected to survive. This is in contrast to RFID (Radio-Frequency Identification), which requires internal electrical connectivity, and UPC codes which require that the surface of the label bearing the code remain intact.

The ability to make small tags is also an advantage. At sizes as small as 20 microns across, the tags are inconspicuous enough to avoid casual inspection. This is helpful for both security and forensic applications. Tagging systems that rely on larger tags may expect a consumer to remove the tag upon purchase, but a tag that is small enough to avoid notice will be less likely to be removed.

Figure 8:
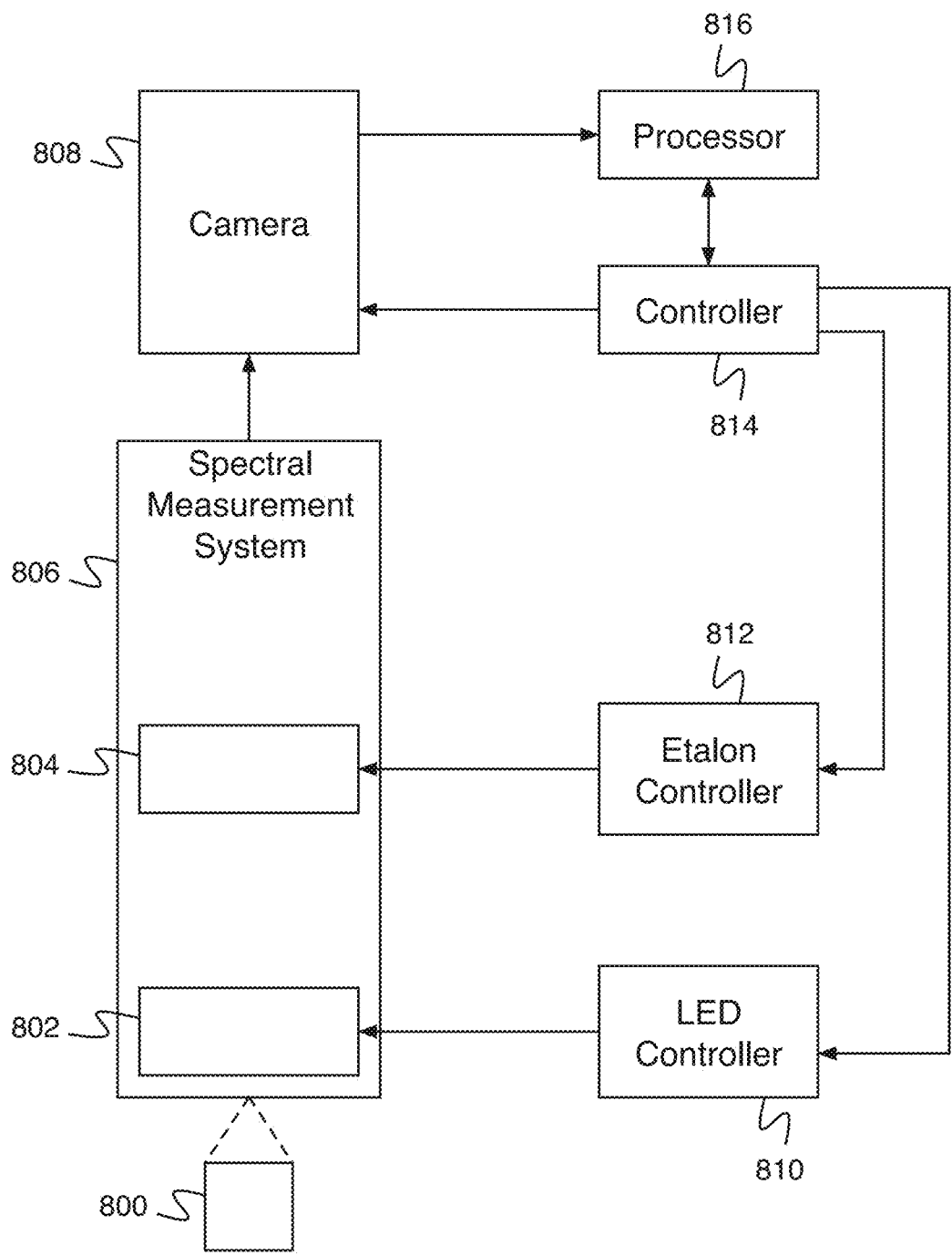
FIG. 8 is a diagram illustrating an embodiment for relative and/or absolute spectral measurement that incorporates a processor to control a tunable Fabry-Perot interferometer, camera, and light source.

FIG. 8 is a diagram illustrating an embodiment for relative and/or absolute spectral measurement that incorporates a processor to control a tunable Fabry-Perot interferometer, camera, and light source. In some embodiments, system of FIG. 8 uses etalon 804 (e.g., etalon 152 of FIG. 1). In the example shown, light source 802 is reflected off of a sample sitting on or in substrate 800 and propagates through the spectral measurement system 806. In some embodiments, spectral measurement system 806 comprises two video objectives and a negative chromatic lens. Camera 808 captures spectral data and transmits it to processor 816. Controller 814 provides instruction to camera 808 (e.g., when to capture data). Processor 816 controls etalon 804 and light source 802 via the controller 814 which sends instructions to the etalon controller 812 and LED controller 810.

In various embodiments, camera 808 comprises a light measurement device, an array of photodetectors, a color imaging device, or any other appropriate detector.

In some embodiments, whenever a wide spectral range has to be scanned, one or a small number of wideband light sources are used to illuminate a target. These wideband sources sometimes have to be filtered to a narrower but still wide band, in order to exclude undesirable harmonics. In either case, if a high finesse is desired, either the spectral range has to be limited so that only one order passes through the tunable etalon, or another filter (e.g., a second etalon) has to be used to select only one interference order. An improved method uses the relative intensities detected by an RGB color filter to separate up to 3 interference orders passing the tunable Fabry-Perot etalon simultaneously.

In some embodiments, using an imaging tunable Fabry-Perot etalon for filtering narrow spectral bands, there are very large losses of energy because all the out-of-band light is wasted, i.e., is not generating usable information. This is not amenable for use in energy-limited hyperspectral imagers, such as those requiring battery operation.

In some embodiments, a group of narrowband LEDs (~6-60) is used to illuminate a reflective target. For each position (gap) of the tunable Fabry-Perot etalon, it is known which wavelengths will be transmitted. Only the LEDs emitting these wavelengths are simultaneously switched on while that associated gap is used for taking a measurement. In some embodiments, up to 3 orders are transmitted, and they can be separated using filters in front of detectors to detect 3 separate images (e.g., red image, green image, and a blue image of a RGB sensor). This way a significant energy saving (possibly 60%, depending on the LEDs bandwidth) is achieved. For example, if the LEDs are such that each illuminates a fraction of a frequency band then this enables the system to reduce power consumption at any given time by turning off the unused illumination power. Thus, when measuring a given band associated with given LED(s), the other LED(s) not associated with the given band can be switched off.

In some embodiments, these up-to-three LEDs for a given LED gap are switched on sequentially. In some embodiments, there are more than one of a given LED (e.g., type of LED) and all of the LEDs of a type are turned or off at a given time. The turning on and off of the LEDs during data acquisition can take more time, but there is no need for separating different orders of light transmitted through the etalon (e.g., using an RGB sensor, processing, and/or combinations thereof).

In some embodiments, it is noted that typically, for a series of gaps, a given wavelength is transmitted in more than one gap. For example, it may be transmitted as a first order in a first gap, as a second order in a second gap, etc. One may decide to only sample each (or some) of the wavelengths only once so as to optimize power consumption and decrease total acquisition time, and/or to simplify signal processing. In this implementation, only a selected subset of the wavelengths which are expected to be transmitted is illuminated by the LEDs to achieve these objectives.

In some embodiments, the group of LEDs needs to be arranged in such a way that they illuminate the target with sufficient uniformity. This can be done, for example, by placing the LEDs in a fine pitch such that when the light emanating from them impinges on the target, the light from the different LEDs is sufficiently uniform. Alternately, a combiner and/or mixer or a diffuser such as a holographic diffuser can be used to diffuse and homogenize the light from the various LEDs. Alternately, light from the various LEDs (which in this embodiment do not need to be placed in a fine pitch) can be coupled to fibers and the other tip of those fibers is placed sufficiently close to each other and sufficiently far from the object, such that a sufficiently uniform illumination is achieved. In all of these embodiments, more than one instance of each of the LEDs may be used. For example, two or more instances of all LEDs may be used in order to increase uniformity. This usage of more than one LED instance can also increase the total illumination power without increasing acquisition times. Also, using more than one instance of some of the LEDs can be used to equalize the illumination power across wavelengths. For example, if an LED with central wavelength lambda 1 emits half the power of an LED with central wavelength lambda 2, one may place two LEDs of wavelength lambda1 in the LED array and switch them on simultaneously to ensure that a constant power illuminates the target regardless of wavelength.

Figure 9A:
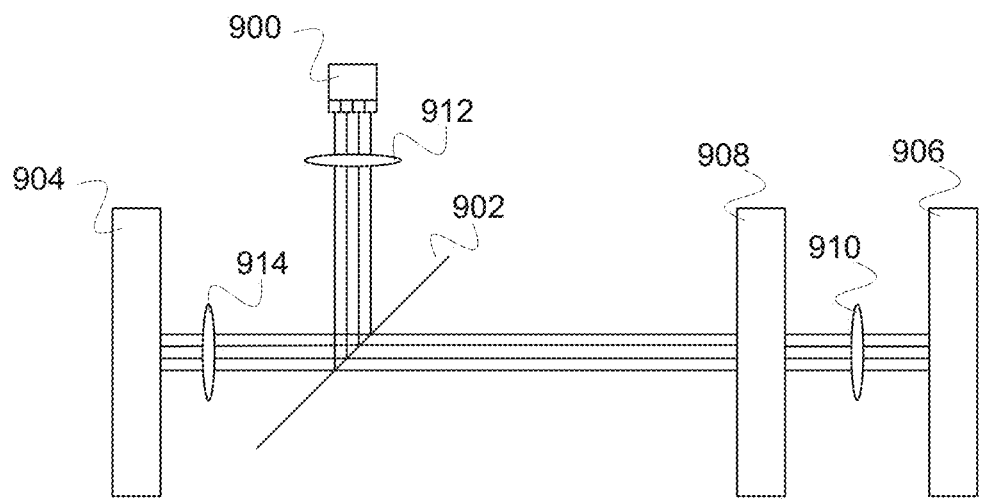
FIG. 9A is a diagram illustrating an embodiment of a light source comprising a plurality of LEDs.

FIG. 9A is a diagram illustrating an embodiment of a light source comprising a plurality of LEDs. In some embodiments, light source of FIG. 9A is used in a measurement system (e.g., system of FIG. 4, FIG. 5, and FIG. 8). In some embodiments, light source 900 comprises light source 802 of FIG. 8. In the example shown, light source 900 comprises a plurality of LEDs. Light is emitted from light source 900 and traverses optic 912 (e.g., one or more lenses). Light propagates to be reflected by beam splitter 902 through focusing optic 914 towards substrate 904, which has associated with it zero or more tags for measurement. Light is reflected by substrate 904 and/or the tag(s), passes through focusing optic 914, beam splitter 902, Fabry-Perot etalon 908, optic 910, and is collected by detector 906. In the example shown, the LEDs of light source 900 are placed together with a fine pitch (e.g., a small distance from the center of a first LED to the center of a next LED) in order to improve the uniformity of the illumination of substrate 904. In some embodiments, the number of LEDs of light source 900 is limited by the uniformity of the illumination of substrate 904 (e.g., even when LEDs are arranged as tightly as possible, when more than a certain number of LEDs are incorporated into light source 900, some LEDs are far enough from other LEDs that the uniformity of illumination of substrate 904 falls below the required uniformity). In some embodiments, light from the plurality of LEDs of light source 900 is able to be collimated at the Fabry-Perot etalon 908. In some embodiments, the plurality of LEDs of light source 900 are disposed in a physical array small enough such that the light from each of the LEDs arrives at the Fabry-Perot etalon 908 traveling in a direction substantially perpendicular to a surface of Fabry-Perot etalon 908.

Figure 9B:
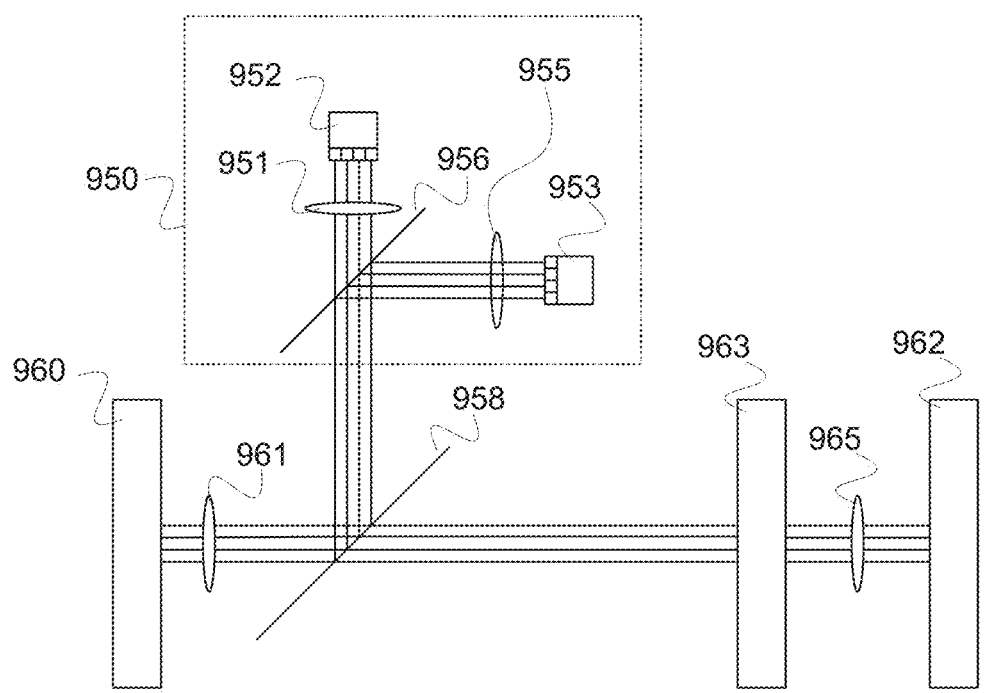
FIG. 9B is a diagram illustrating an embodiment of a light source comprising a plurality of LEDs.

FIG. 9B is a diagram illustrating an embodiment of a light source comprising a plurality of LEDs. In some embodiments, light source of FIG. 9B is used in a measurement system (e.g., system of FIG. 4, FIG. 5, and FIG. 8). In some embodiments, combined light source 950 comprises light source 802 of FIG. 8. In the example shown, combined light source 950 combines light from light source 952 and light source 953. Light source 952 and light source 953 comprise a plurality of LEDs. Light is emitted from light source 952 and traverses optic 951 (e.g., one or more lenses). Light is emitted from light source 953 and traverses optic 955 (e.g., one or more lenses). Light is combined using beam splitter 956. Light propagates to be reflected by beam splitter 958 through focusing optic 961 towards substrate 960, which has associated with it zero or more tags for measurement. Light is reflected by substrate 960 and/or the tag(s), passes through focusing optic 961, beam splitter 958, Fabry-Perot etalon 963, optic 965, and is collected by detector 962. In the example shown, the LEDs of light source 952 are placed together with a fine pitch (e.g., a small distance from the center of a first LED to the center of a next LED) in order to improve the uniformity of the illumination of substrate 904. The LEDs of light source 953 are placed together with a fine pitch (e.g., a small distance from the center of a first LED to the center of a next LED) in order to improve the uniformity of the illumination of substrate 960. In some embodiments, the number of LEDs of combined light source 950 is limited by the uniformity of the illumination of substrate 960 (e.g., even when LEDs are arranged as tightly as possible, when more than a certain number of LEDs are incorporated into combined light source 950, some LEDs are far enough from other LEDs that the uniformity of illumination of substrate 904 falls below the required uniformity). In some embodiments, light from the plurality of LEDs of combined light source 950 is able to be collimated at the Fabry-Perot etalon 963. In some embodiments, the plurality of LEDs of light source 950 are disposed in a physical array small enough such that the light from each of the LEDs arrives at the Fabry-Perot etalon 963 traveling in a direction substantially perpendicular to a surface of Fabry-Perot etalon 963

Figure 9C:
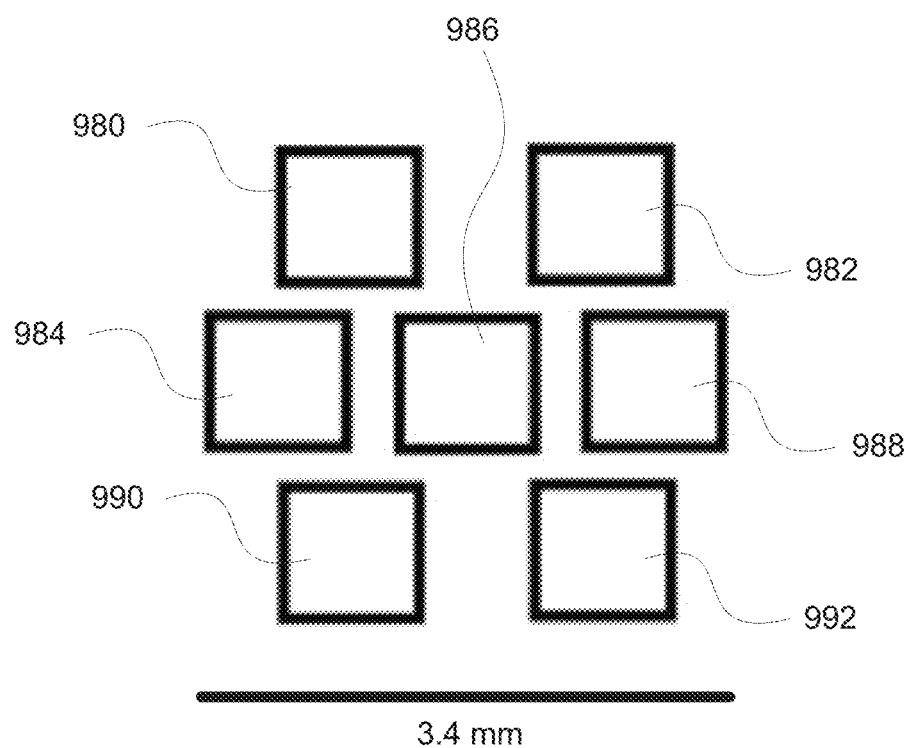
FIG. 9C is a diagram illustrating an embodiment of a LED array.

FIG. 9C is a diagram illustrating an embodiment of a LED array. In some embodiments, the top view of an LED array of FIG. 9C is used to implement light source 900, light source 952, and light source 953. In the example shown, LED 980, LED 982, LED 984, LED 986, LED 988, LED 990, and LED 992 are positioned in an array. Each LED is approximately 1 mm square with approximately 0.2 mm spacing between the closest elements. The expanse of the array is approximately 3.4 mm across. This tight grouping of LED sources enables the light emitted from the LED sources to be collimated at a Fabry-Perot etalon. The tight grouping of LED sources and combination of optics allows the LED sources to appear as a point source within the focal region of the collimating optics.

Figure 10A:
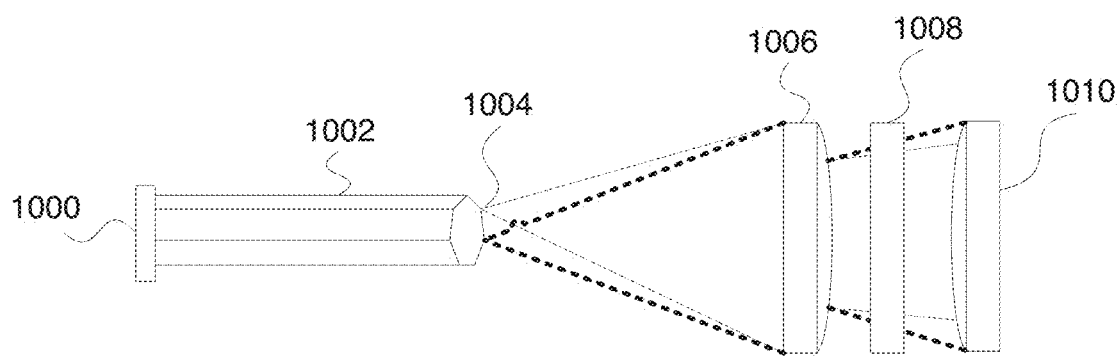
FIG. 10A is a diagram illustrating an embodiment of a light source.

FIG. 10A is a diagram illustrating an embodiment of a light source. In some embodiments, light source of FIG. 10A is used in a measurement system (e.g., system of FIG. 4, FIG. 5, and FIG. 8). In the example shown, hexagonal light pipe 1002 provides even illumination from each LED of light source 1000 to the other end of light pipe 1002. Lens 1004 expands the source light to fill planoconvex lens 1006 to achieve the required illumination numerical aperture. Diffuser plate 1008 is placed between planoconvex lens 1006 and planoconvex lens 1010 to homogenize the intensity distribution. The light is then reflected onto a target that includes spectral target (e.g., florescent labels, optical filters, rugate tags, etc.).

Figure 10B:
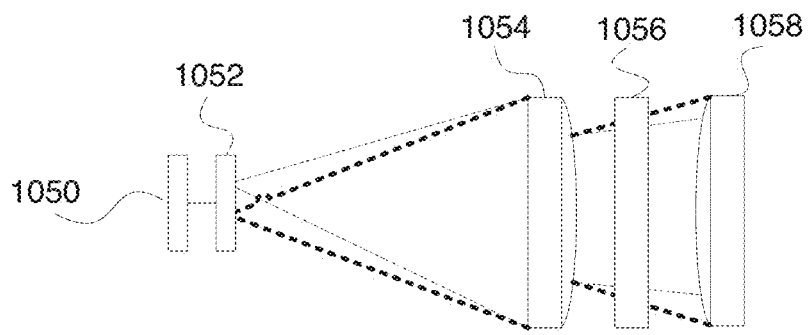
FIG. 10B is a diagram illustrating an embodiment of a light source.

FIG. 10B is a diagram illustrating an embodiment of a light source. In some embodiments, light source of FIG. 10B is used in a measurement system (e.g., system of FIG. 4, FIG. 5, and FIG. 8). In the example shown, opal diffusing glass 1052 diffuses light from light source 1050. Diffused light then fills planoconvex lenses 1054. The light is diffused again using diffuser plate 1056 before reaching planoconvex lens 1058. The light is then reflected onto a target that includes spectral target (e.g., florescent labels, optical filters, rugate tags, etc.).

In some embodiments, the time that the actuators stop at each gap spacing is not identical. This is done to accommodate different optical power outputs of different color LEDs. For example, if LED1 emits half the power of LED2, the dwell time (corresponding to the image sensor integration time) for LED1 is set to twice that of LED2. Alternately, the integration time may remain the same for all captured images but two frames are captured for the gap where LED1 illuminates (this is advantageous because often changing the integration time of the image sensor on the fly is costly or impossible).

In some embodiments, these equalization schemes are used to compensate for known system imperfections. For example, if it is known that the quantum efficiency of the detector is poor, for example, in longer wavelengths, the above equalization schemes can be used to compensate for this. In this case, a spectral target of known uniform spectral reflectance can be used to calibrate the different LED power outputs. This is done by illuminating the target with all LEDs operating at full power, and iteratively measuring the reflected light and reducing the power where necessary to achieve, when the background is removed, a uniform spectral response from the detector. This maximizes the usable dynamic range of the detector and simplifies the interpretation of measurements. Another case for equalization is when there is a priori knowledge that at certain wavelengths, the signal may be lower and/or the background or noise may be higher than in other wavelengths. In some of these cases, equalization can improve the signal-to-noise ratio.

In some embodiments, the actuators controlling the gap spacing of the tunable Fabry-Perot etalon mirrors do not wait for the LEDs to turn on and for an image of the reflected image to be captured and recorded. Rather, the actuators continuously scan the gap spacing, using active feedback to ensure the mirrors are always parallel. LEDs switch on and off based on the range of wavelengths which are transmitted in a range of gaps. When an image is captured, the active feedback signal (e.g., the capacitance between the mirror plates) is also captured, thus allowing one to know the instantaneous gap when the image was captured. This allows for much faster total acquisition of the data cube. Spectral resolution may be compromised unless adequate parallelism is maintained and the image sensor integration time is short with respect to the change of transmitted wavelengths through the tunable Fabry-Perot etalon.

In some embodiments, the key system elements, i.e., LEDs, tunable Fabry-Perot etalon actuators and active feedback mechanism, and the image sensor (and frame grabber) need to be synchronized. This can be done by a central controller such as a microcontroller, an FPGA or a processor. A typical sequence for a gap-stepper scheme is: a) actuators move plates to a given gap based on an active feedback signal (e.g., capacitance) and using a calibration table; b) controller turns 1-3 LEDs on; c) Image sensor captures one or more images and transfers to memory or a processor; and this repeats until all gaps have been scanned.

FIG. 11 is a diagram illustrating an embodiment of a gap calibration table. Gap calibration table 1100 comprises a set of gap calibration data comprising a set of spectral peak wavelengths associated with each gap of a set of gaps of a Fabry-Perot etalon. In some embodiments, spectral peaks of FIG. 11 correspond to center wavelength pass bands associated with an air gap of a Fabry-Perot etalon as shown in FIG. 3. In the example shown, the gap calibration table includes one or more spectral peaks for a gap value of the set of gap values—for example, the first spectral peak wavelength, the second spectral peak wavelength, and the third spectral peak wavelength are shown for each gap of a set of gaps. In various embodiments, gap calibration table 1100 comprises three spectral peak wavelengths for each gap, five spectral peak wavelengths for each gap, ten spectral peak wavelengths for each gap, or any other appropriate number of spectral peak wavelengths for each gap. The set of gaps shown comprises gaps from 1 µm to 1.8 µm in 0.1 µm steps. In various embodiments, gap calibration table 1100 comprises larger gaps, smaller gaps, more closely spaced gaps, or any other appropriate set of gaps. In some embodiments, the spectral peak wavelengths shown in gap calibration table 1100 comprise derived wavelengths (e.g., wavelengths determined from a Fabry-Perot etalon characteristic equation). In some embodiments, the spectral peak wavelengths shown in gap calibration table 1100 comprise measured wavelengths (e.g., wavelengths determined by manufacturing a Fabry-Perot etalon and measuring the spectral peak wavelengths associated with each gap size). In some embodiments, measured wavelengths are associated with a given Fabry-Perot etalon design (e.g., one etalon of a given design is measured and the determined gap calibration table is associated with all manufactured Fabry-Perot etalons of that design). In some embodiments, measured wavelengths are associated with a specific Fabry-Perot etalon (e.g., each manufactured Fabry-Perot etalon is measured and the determined gap calibration table is associated with that etalon). In the example shown, a given spectral peak wavelength (e.g., the first spectral peak wavelength, the second spectral peak wavelength, etc.) increases linearly as the gap size increases. Higher spectral peaks increase more rapidly as the gap size increases.

Figure 12:
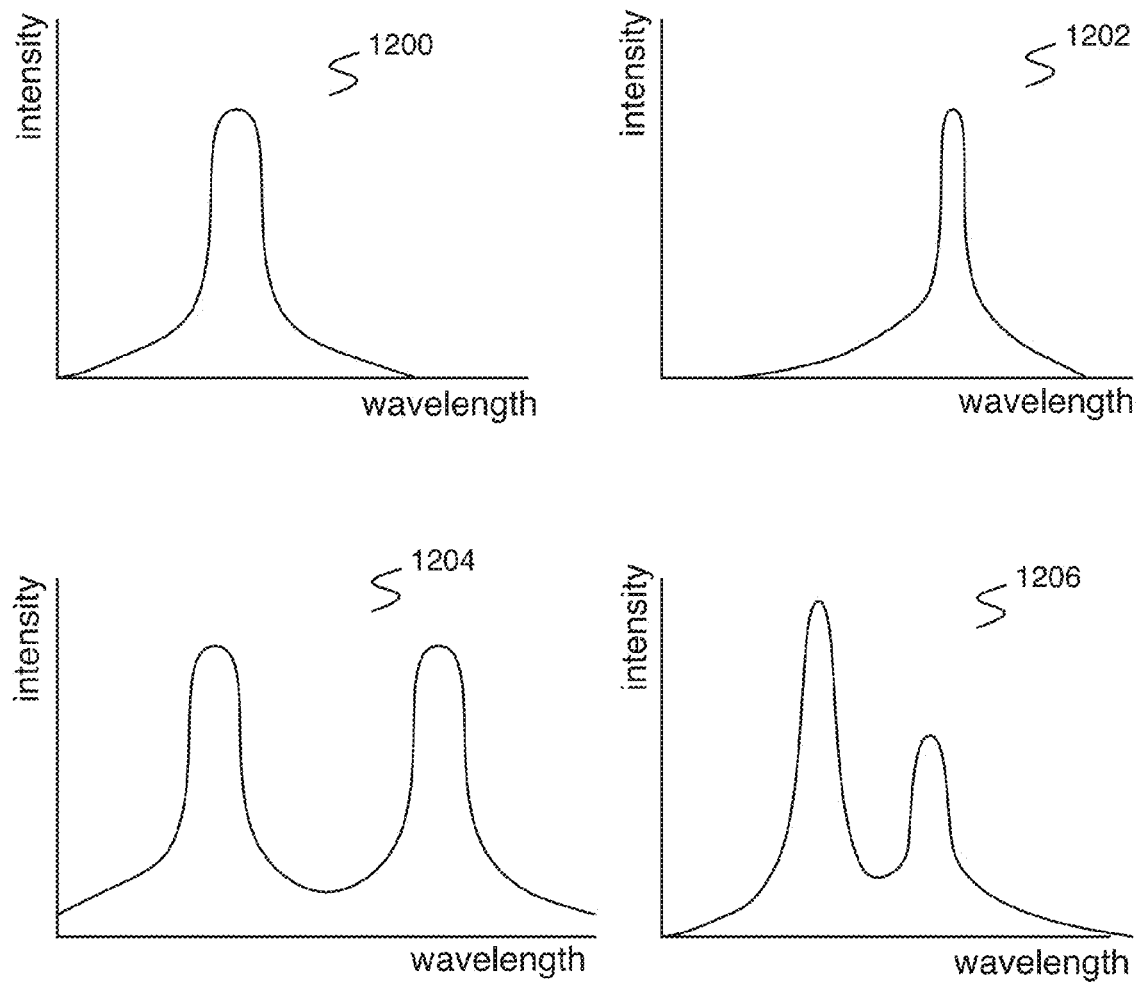
FIG. 12 is a diagram illustrating an embodiment of LED data.

FIG. 12 is a diagram illustrating an embodiment of LED data. In some embodiments, the LED data of FIG. 12 is associated with light source 802 of FIG. 8. In the example shown, the data of FIG. 12 comprises intensity vs. wavelength data for a set of four LEDs powered at a reference power level. The LED data comprises power characteristics of a plurality of LEDs. LED data 1200 comprises a single broad peak at a lower wavelength; LED data 1202 comprises a single narrow peak at a higher wavelength; LED data 1204 comprises two widely spaced equal height broad peaks; LED data 1206 comprises two narrow peaks, closely spaced and at different heights. In various embodiments, LED data comprises wide peaks, narrow peaks, tall peaks, short peaks, high wavelength peaks, low wavelength peaks, a single peak, two or more peaks, closely spaced peaks, widely spaced peaks, or any other appropriate peaks. In some embodiments, LED data comprises measured data.

FIG. 13 is a diagram illustrating an embodiment of an LED switch table. In some embodiments, an LED switch table is associated with LED controller 810 of FIG. 8. In the example shown, LED switch table 1300 indicates whether a given LED (e.g., LED 1, LED 2, LED 3, etc.) should be turned on when a Fabry-Perot etalon passband allows a given wavelength of light to pass through. In the event that LED switch table 1300 indicates that an LED should be on for a measurement at a given wavelength, LED switch table 1300 additionally indicates the LED power output at that wavelength. In various embodiments, all LEDs with sufficient power are illuminated during a measurement, one LED with sufficient power is illuminated during a measurement, each LED with sufficient power is illuminated for a separate measurement, a subset of LEDs with sufficient power are illuminated for separate measurements, all LEDs are used over a course of several measurements (either one LED for each measurement, a group of LEDs for each measurement, all LEDs for one measurement, etc.), or any other appropriate combination of LED illumination and measurement. In some embodiments, LED switch table 1300 indicates that an LED should be on for a measurement at a given wavelength in the event that the power output at that wavelength is above a threshold. In some embodiments, a power setting value is determined so that a detected response at a detector has a flat response—for example, a plurality of LEDs have a power setting so that the response at a detector is balanced between the LEDs (e.g., the power setting is set so that each of the LEDs reads the same at a detector from a uniform reflector). In some embodiments, the power setting value is determined using a spectral peak height from the gap calibration table and a power output value from the LED switch table. In the example shown, LED 1 should be turned on for wavelengths from 470 nm to 490 nm, LED 2 should be turned on for wavelengths from 420 nm to 440 nm, and LED 3 should be turned on for wavelengths from 460 nm to 470 nm.

In some embodiments, LED switch table 1300 indicates whether an LED is on for an associated Fabry-Perot etalon air gap size.

Figure 14:
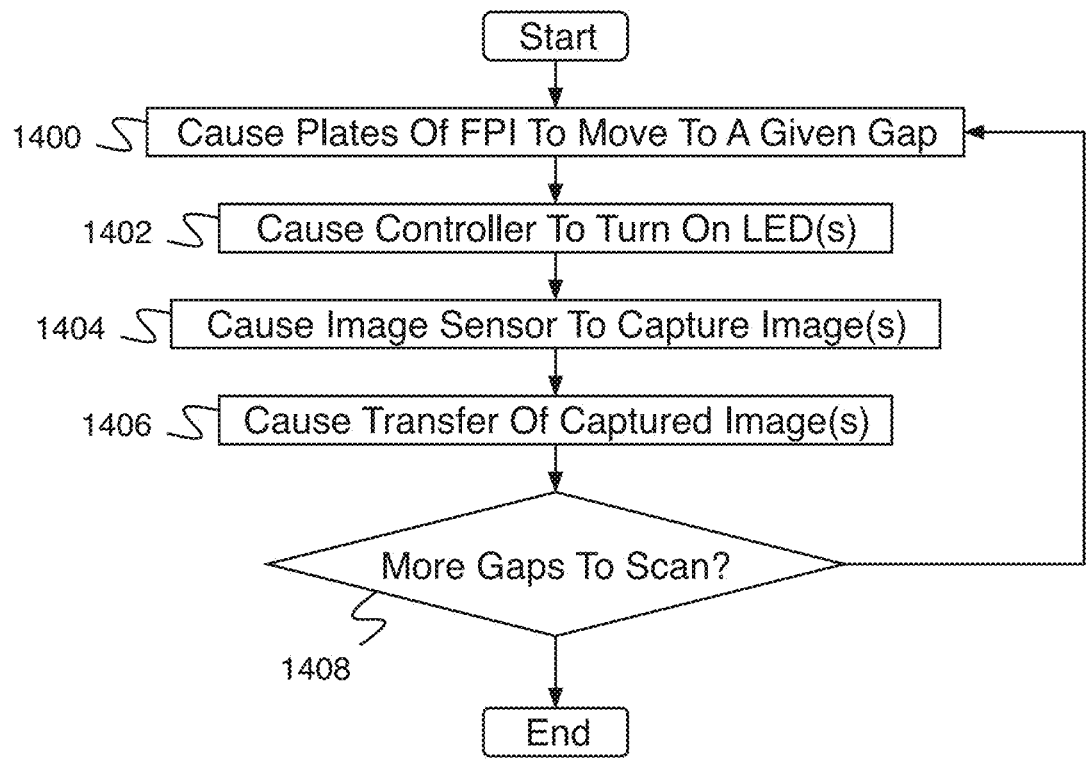
FIG. 14 is a flow diagram illustrating an embodiment of a process for synchronizing a tunable Fabry-Perot etalon gap and LED illumination.

FIG. 14 is a flow diagram illustrating an embodiment of a process for synchronizing a tunable Fabry-Perot etalon gap and LED illumination. In some embodiments, the process of FIG. 14 is executed using the system of FIG. 8. In the example shown, in 1400 plates of an FPI are caused to move to a given gap. For example, a controller indicates to move (e.g., using a piezo mover) the tunable Fabry-Perot etalon plates to a given gap (e.g., as measured using a sensor—for example, a capacitive sensor). In 1402, a controller causes LEDs to be turned on. For example, selected LEDs whose emitted illumination have wavelengths that correspond to wavelengths that will pass through the given gap of the tunable Fabry-Perot etalon. In some embodiments, the wavelengths that will pass through the given gap of the tunable Fabry-Perot etalon pass as a primary order, a secondary order, etc. In 1404, an image sensor is caused to capture image(s). For example, one or more image(s) is caused (e.g., using a controller or processor to indicate or cause) to capture light that has passed through the tunable Fabry-Perot etalon. In some embodiments, simultaneous or sequential images with different prefilters (e.g., red, green, blue, etc.) are captured to acquire spectral images at different frequencies. In 1406, transfer of captured image(s) is caused. For example, a controller indicates to transfer the captured image(s) to a processor or a memory. In some embodiments, after 1404 is finished, 1406 occurs concurrently with 1400 and is not waiting for the completion of 1406. In 1408, it is determined whether there are more gaps to scan. In the event that there are more gaps to scan, control passes to 1400. In the even that there are not more gaps to scan, the process ends.

In some embodiments, for the scanning implementation, that sequence is slightly different: a) actuators scan the whole gap without stopping while constantly adjusting drive voltages to ensure parallelism using a calibration lookup table; b) when a controller receives active feedback monitor signals from the tunable Fabry-Perot etalon (e.g., capacitance values corresponding to specific gaps), it turns on appropriate LEDs; c) the controller then activates an image capture from an image sensor; d) the active feedback monitor signal is recorded at the same instant the image has been captured and these are sent to a processor or memory element for later analysis.

Figure 15:
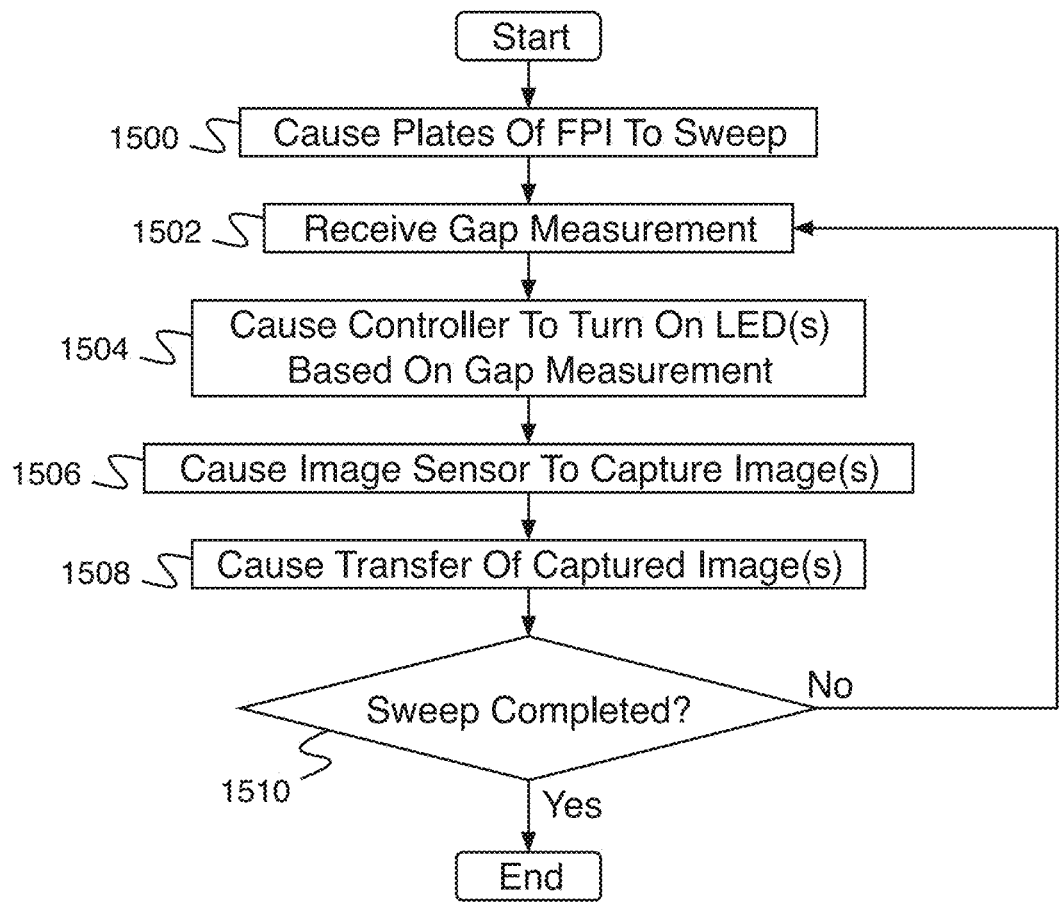
FIG. 15 is a flow diagram illustrating an embodiment of a process for synchronizing a tunable Fabry-Perot etalon gap and LED illumination.

FIG. 15 is a flow diagram illustrating an embodiment of a process for synchronizing a tunable Fabry-Perot etalon gap and LED illumination. In some embodiments, the process of FIG. 14 is executed using the system of FIG. 8. In the example shown, in 1500 plates of tunable Fabry-Perot etalon are caused to sweep. For example, a controller indicates to sweep (e.g., using a piezo mover) the tunable Fabry-Perot etalon over a series of gaps (e.g., as measured using a sensor—for example, a capacitive sensor). In 1502, a gap measurement is received. For example, a signal is received from a sensor indicating the gap distance and a measurement based on the signal is provided to a controller. In 1504, a controller causes LEDs to be turned on based on the gap measurement. For example, selected LEDs whose emitted illumination have wavelengths that correspond to wavelengths that will pass through the given gap of the tunable Fabry-Perot etalon. In some embodiments, the wavelengths that will pass through the given gap of the tunable Fabry-Perot etalon pass as a primary order, a secondary order, etc. In 1506, an image sensor is caused to capture image(s). For example, one or more image(s) is caused (e.g., using a controller or processor to indicate or cause) to capture light that has passed through the tunable Fabry-Perot etalon. In some embodiments, simultaneous or sequential images with different prefilters (e.g., red, green, blue, etc.) are captured to acquire spectral images at different frequencies. In some embodiments, after 1506 is finished, 1508 occurs concurrently with 1502 and is not waiting for the completion of 1508. In 1508, transfer of captured image(s) is caused. For example, a controller indicates to transfer the captured image(s) to a processor or a memory. In 1510, it is determined whether the sweep is completed. In the event that sweep is not completed, control passes to 1502. In the event that the sweep is completed, the process ends.

Figure 16:
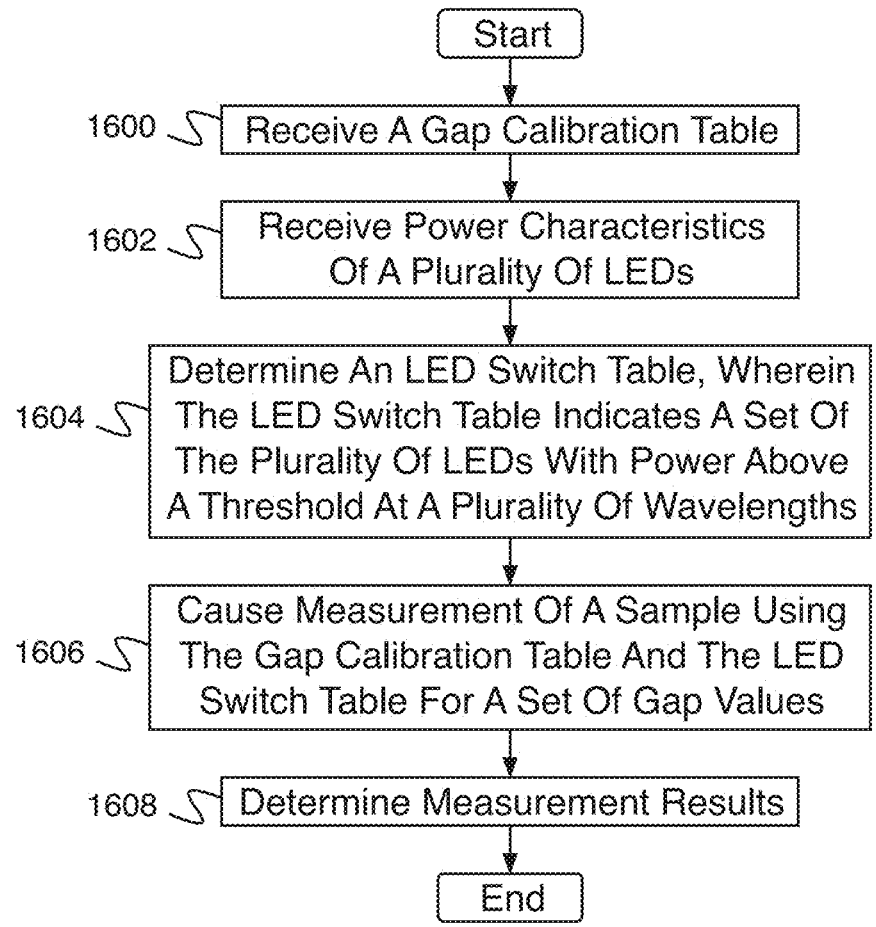
FIG. 16 is a flow diagram illustrating an embodiment of a process for spectral reading using synchronized LED sources.

FIG. 16 is a flow diagram illustrating an embodiment of a process for spectral reading using synchronized LED sources. In some embodiments, the process of FIG. 16 is executed by processor 816 of FIG. 8. In the example shown, in 1600, a gap calibration table is received. In 1602, power characteristics of a plurality of LEDs are received. In 1604, an LED switch table is determined, wherein the LED switch table indicates a set of the plurality of LEDs with power above a threshold at a plurality of wavelengths. In 1606, measurement of a sample is caused using the gap calibration table and the LED switch table for a set of gap values. In 1608, measurement results are determined.

Figure 17:
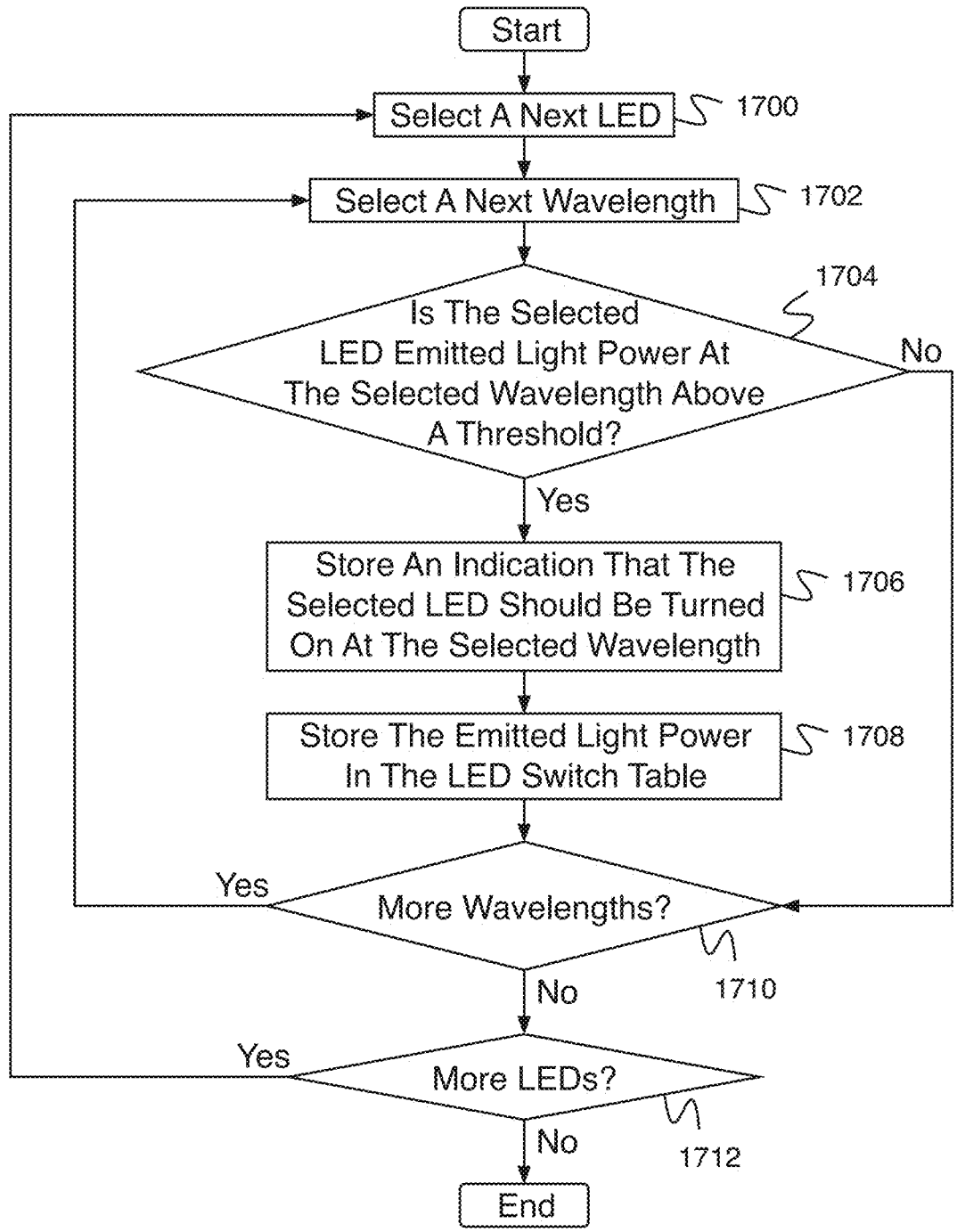
FIG. 17 is a flow diagram illustrating an embodiment of a process for determining an LED switch table.

FIG. 17 is a flow diagram illustrating an embodiment of a process for determining an LED switch table. In some embodiments, the process of FIG. 17 implements 1604 of FIG. 16. In the example shown, in 1700, a next LED is selected. In 1702, a next wavelength is selected. In 1704, it is determined whether the selected LED emitted light power at the selected wavelength is above a threshold. In the event it is determined that the selected LED emitted light power at the selected wavelength is below the threshold, control passes to 1710. In the event it is determined that the selected LED emitted light power at the selected wavelength is above the threshold, control passes to 1706. In 1706, an indication that the selected LED should be turned on at the selected wavelength is stored. In 1708, the emitted light power is stored in the LED switch table. In 1710 it is determined whether there are more wavelengths (e.g., more wavelengths of interest to check for the selected LED). In the event it is determined that there are more LEDs, control passes to 1702. In the event it is determined that there are not more wavelengths, control passes to 1712. In 1712, it is determined whether there are more LEDs (e.g., of a set of LEDs). In the event it is determined that there are more LEDs, control passes to 1700.

Figure 18:
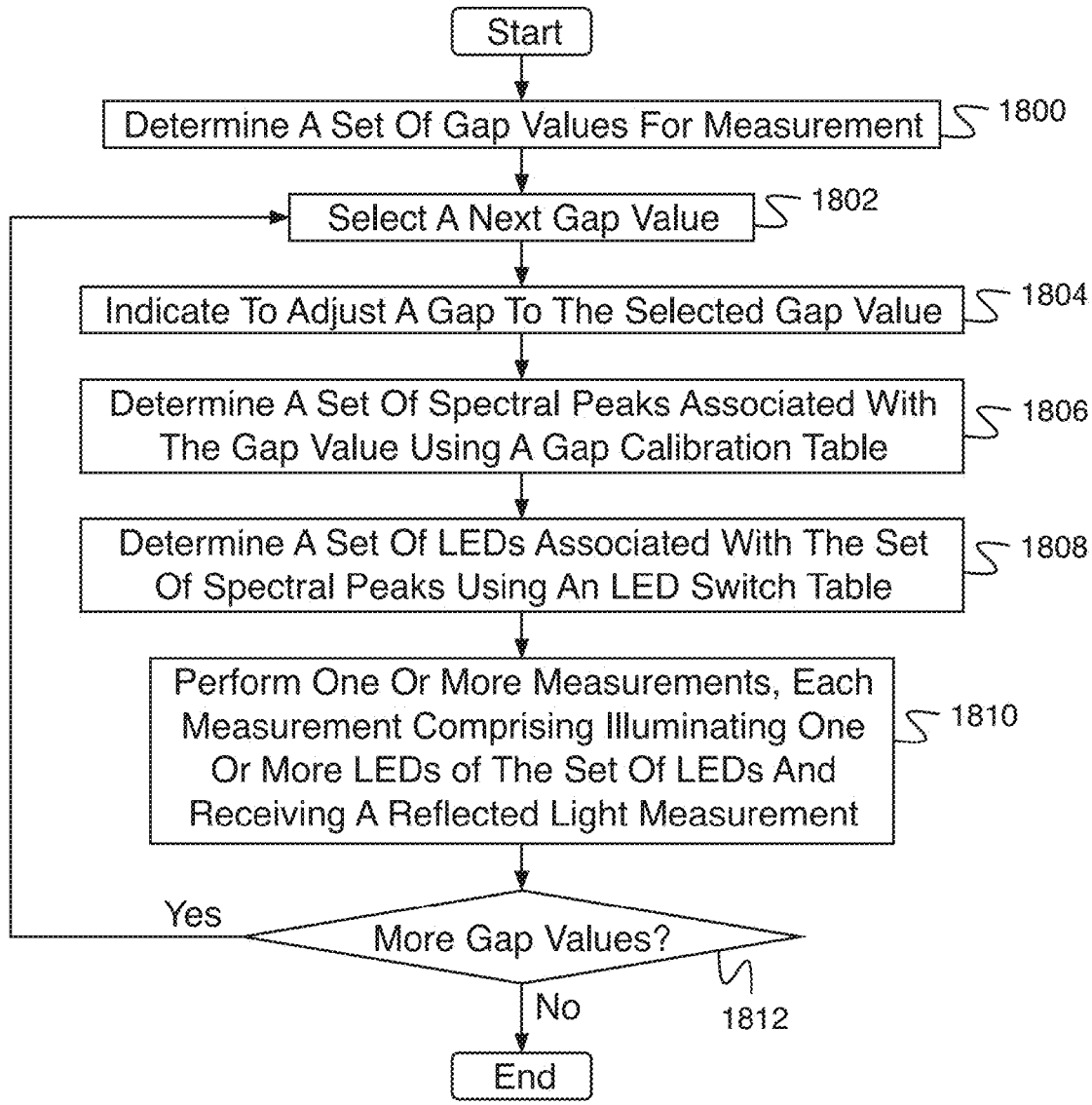
FIG. 18 is a flow diagram illustrating an embodiment of a process for causing measurement of a sample using a gap calibration table and an LED switch table for a set of gap values.

FIG. 18 is a flow diagram illustrating an embodiment of a process for causing measurement of a sample using a gap calibration table and an LED switch table for a set of gap values. In some embodiments, the process of FIG. 18 implements 1606 of FIG. 16. In the example shown, in 1800, a set of gap values for measurement is determined. In 1802, a next gap value is selected. In 1804, it is indicated to adjust a gap to the selected gap value. In 1806, a set of spectral peaks associated with the gap value is determined using a gap calibration table. In 1808, a set of LEDs associated with the set of spectral peaks is determined using an LED switch table. In 1810, one or more measurements is performed, each measurement comprising illuminating one or more LEDs of the set of LEDs and receiving a reflected light measurement. In 1812, it is determined whether there are more gap values. In the event it is determined that there are more gap values, control passes to 1802. In the event it is determined that there are not more gap values, the process ends.

Figure 19:
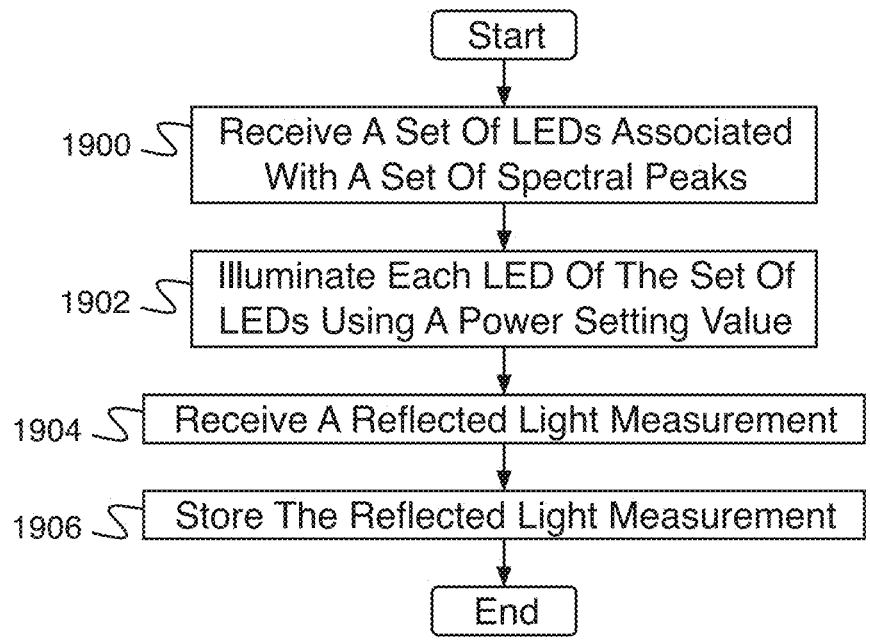
FIG. 19 is a flow diagram illustrating an embodiment of a process for performing one or more measurements.

FIG. 19 is a flow diagram illustrating an embodiment of a process for performing one or more measurements. In some embodiments, the process of FIG. 19 implements 1810 of FIG. 18. In the example shown, in 1900, a set of LEDs associated with a set of spectral peaks is received. In 1902, each LED is illuminated using a power setting value. In some embodiments, the power setting value is based at least in part on a power output measurement stored in an LED switch table. In some embodiments, the power setting value is determined so that a detected response at a detector has a flat spectral response (e.g., the power setting value is increased for LEDs with a low power output measurement and decreased for LEDs with a high power output measurement). In 1904, a reflected light measurement is received. In 1906, the reflected light measurement is stored.

Figure 20:
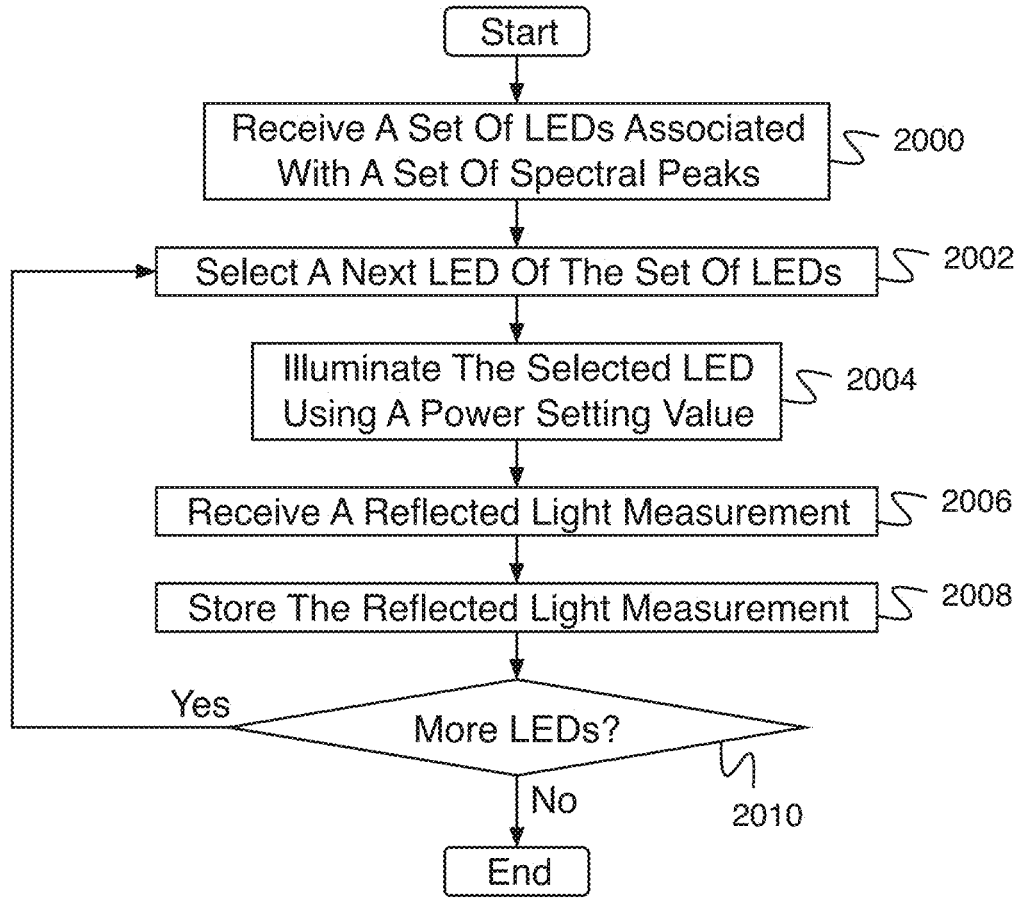
FIG. 20 is a flow diagram illustrating an embodiment of a process for performing one or more measurements.

FIG. 20 is a flow diagram illustrating an embodiment of a process for performing one or more measurements. In some embodiments, the process of FIG. 20 implements 1810 of FIG. 18. In the example shown, in 2000, a set of LEDs associated with a set of spectral peaks is received. In 2002, a next LED of the set of LEDs is selected. In 2004, the selected LED is illuminated using a power setting value. In 2006, a reflected light measurement is received. In 2008, the reflected light measurement is stored. In 2010, it is determined whether there are more LEDs of the set of LEDs. In the event it is determined that there are more LEDs of the set of LEDs, control passes to 2002. In the event it is determined that there are not more LEDs of the set of LEDs, the process ends.

Figure 21:
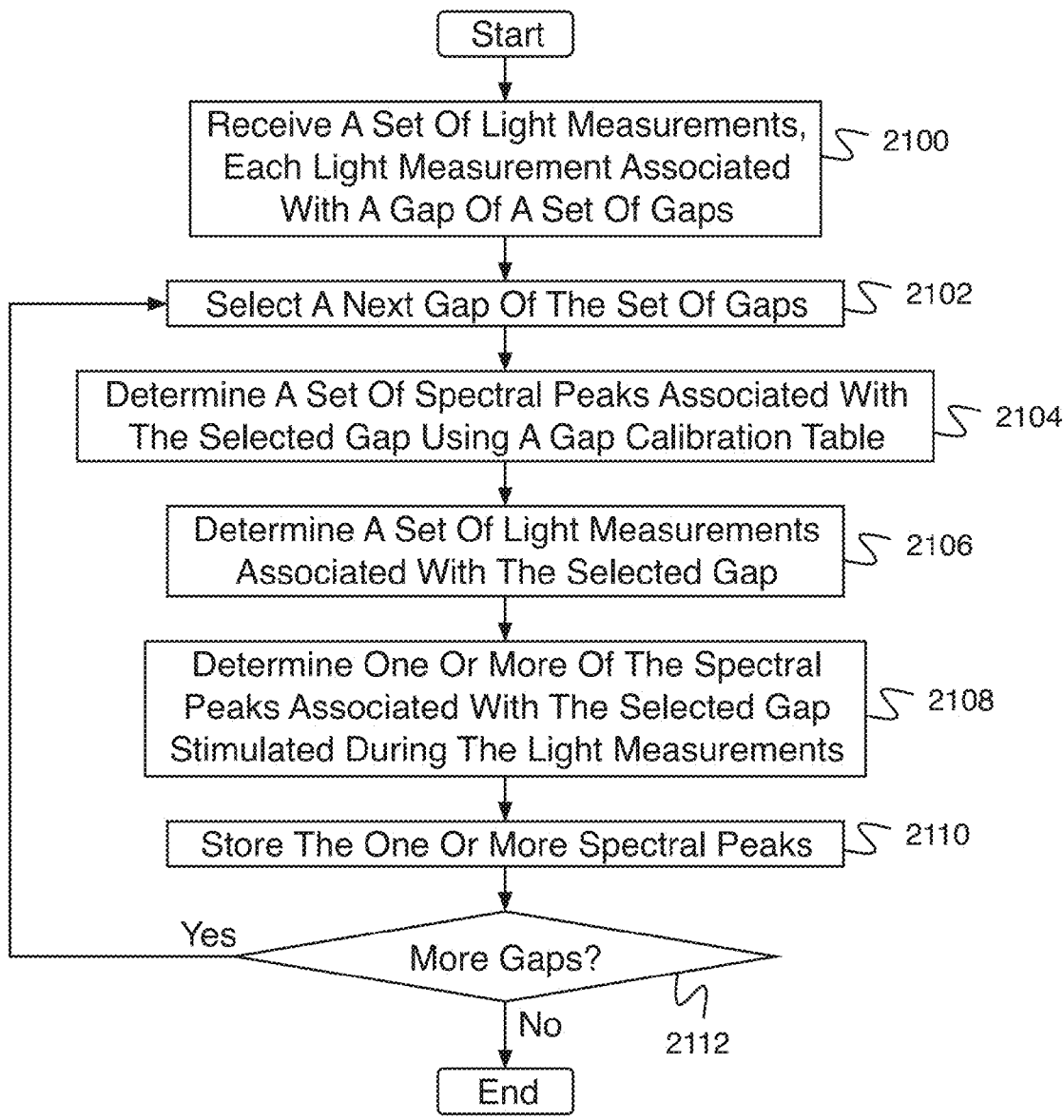
FIG. 21 is a flow diagram illustrating an embodiment of a process for determining measurement results.

FIG. 21 is a flow diagram illustrating an embodiment of a process for determining measurement results. In some embodiments, the process of FIG. 21 implements 1608 of FIG. 16. In the example shown, in 2100, a set of light measurements is received, each light measurement associated with a gap of a set of gaps. In 2102, a next gap of the set of gaps is selected. In 2104, a set of spectral peaks associated with the selected gap are determined using a gap calibration table. In 2106, a set of light measurements associated with the selected gap is determined. In 2108, one or more of the spectral peaks associated with the selected gap is determined to be stimulated during the light measurements. For example, a separation of peaks associated with an image at a given air gap is achieved using calculation (e.g., considering different gap measurements and determining a set of likely wavelengths and their associated peaks) or using filtered images and calculation (e.g., using red, green, blue images to help decode the incident wavelength peaks), or narrow band filtering in front of the detector to determine an exact correspondence to wavelengths and peaks. In 2110 the one or more spectral peaks determined to be simulated are stored. In 2112, it is determined whether there are more gaps. In the event it is determined that there are more gaps, control passes to 2102. In the event it is determined that there are not more gaps, the process ends.

Figure 22:
FIG. 22 is a diagram illustrating views of a spectral reader.

FIG. 22 is a diagram illustrating an embodiment of a spectral reader. In some embodiments, the spectral reader of FIG. 22 implements the system of FIG. 8. In the example shown, portable tag reader 2200 is shown an angled perspective view. Output and collection lens 2202 provides illumination light and collects reflected light from a target. Tag reader is triggered using switch 2204.

Figure 23:
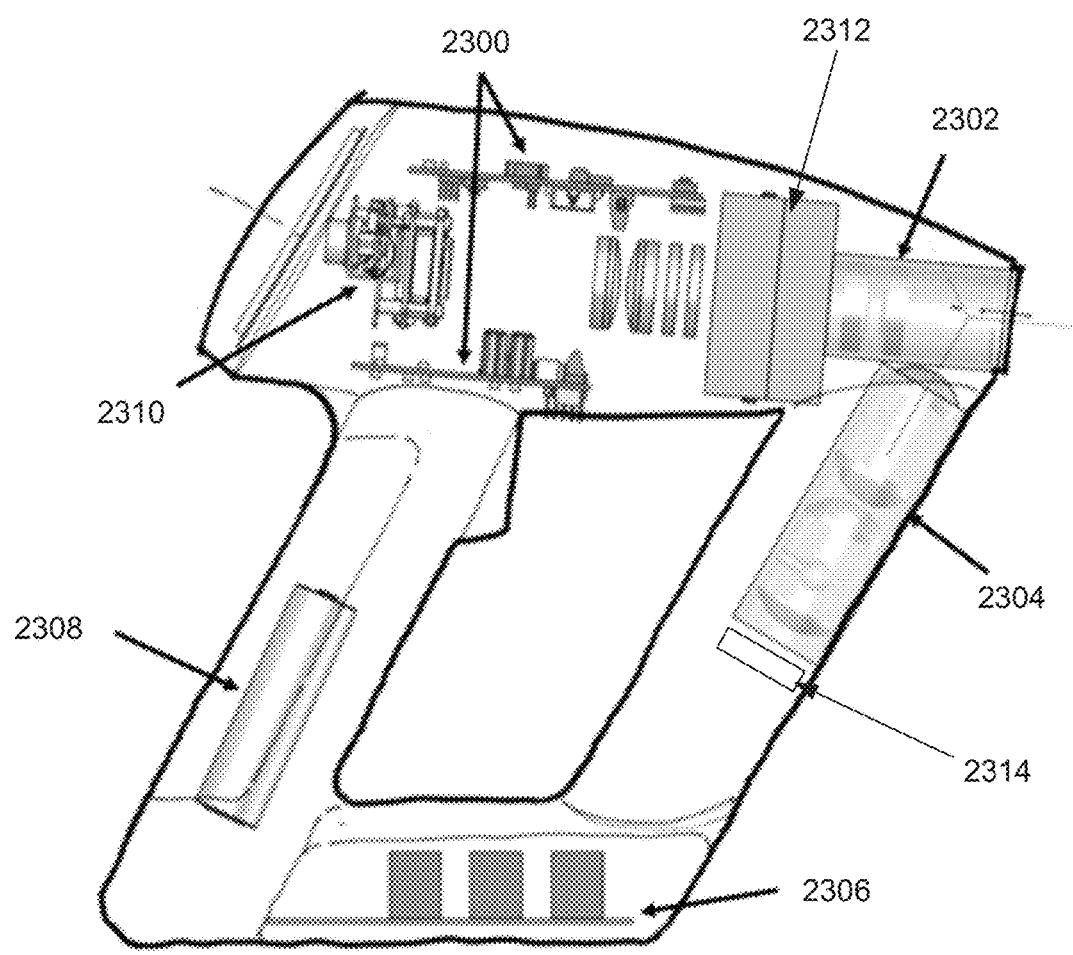
FIG. 23 is a diagram illustrating an embodiment of a cut away view of a spectral reader.

FIG. 23 is a diagram illustrating an embodiment of a cut away view of a spectral reader. In some embodiments, the spectral reader of FIG. 23 comprises the spectral reader of FIG. 22. In the example shown, a sample can be illuminated using light source 2314 (e.g., an array of LEDs) that is relayed to the sample using source optics 2304. Light reflected or emanating from sample is relayed by imaging optics 2302 to Fabry-Perot etalon 2312 and then to image sensor 2310 via intermediate optics. Control electronics 2300 control gap spacing for Fabry-Perot etalon 2312 image sensor 2310 and light source 2314. Image data from image sensor 2310 is processed using processing board 2306. Battery 2308 powers light source 2314, gap mover of Fabry-Perot etalon 2312, control electronics 2314, image sensor 2310, and processing board 2306.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for spectral reading, comprising:
a plurality of LEDs, wherein the plurality of LEDs are disposed in a physical array, and wherein light from the plurality of LEDs is enabled to be collimated at a Fabry-Perot etalon;
an interface configured to:
receive a gap calibration table, wherein the gap calibration table includes a set of spectral peak wavelengths associated with a gap of the Fabry-Perot etalon; and
receive power characteristics of a plurality of LEDs; and
a processor configured to:
determine an LED switch table, wherein the LED switch table indicates a set of the plurality of LEDs with power above a threshold based at least in part on the power characteristics of the plurality of LEDs;
cause measurement of a sample using the gap calibration table and the LED switch table for a set of gap values, wherein the LED switch table indicates which LEDs of the plurality of LEDs to switch on associated with a given gap of a Fabry-Perot etalon; and
determine measurement results.

2. The system of claim 1, wherein the gap calibration table indicates one or more spectral peaks for a gap value of the set of gap values.

3. The system of claim 2, wherein a spectral peak of the one or more spectral peaks for the gap value of the set of gap values comprises a center of a pass band for a Fabry-Perot etalon.

4. The system of claim 1, wherein a power characteristic of an LED of the plurality of LEDs comprises a characteristic of emitted light power vs. light wavelength.

5. The system of claim 1, wherein the LED switch table includes a power output value of an LED of the plurality of LEDs at a set of wavelengths.

6. The system of claim 1, wherein causing measurement of the sample using the gap calibration table and the LED switch table for the set of gap values comprises:
determining the set of gap values for measurement;
for each gap value of the set of gap values:
indicating to adjust a gap to the gap value;
determining a set of spectral peaks associated with the gap value using the gap calibration table;
determining a set of LEDs associated with the set of spectral peaks using the LED switch table; and
causing one or more measurements, each measurement comprising:
illuminating one or more LEDs of the set of LEDs; and
receiving a reflected light measurement.

7. The system of claim 6, wherein all of the one or more LEDs of the set of LEDs are illuminated during the measurement.

8. The system of claim 6, wherein one LED per measurement of the set of LEDs is illuminated for each LED for each gap value of the set of gap values.

9. The system of claim 6, wherein illuminating the one or more LEDs comprises illuminating the one or more LEDs using a power setting value.

10. The system of claim 9, wherein the power setting value is determined so that a detected response at a detector has a flat response.

11. The system of claim 9, wherein the power setting value is determined using a spectral is peak height from the gap calibration table and a power output value from the LED switch table.

12. The system of claim 1, further comprising a Fabry-Perot etalon.

13. The system of claim 12, wherein the processor is further configured to provide an indication to set a gap for the Fabry-Perot etalon.

14. The system of claim 1, further comprising a light measurement device.

15. The system of claim 1, further comprising the plurality of LEDs.

16. The system of claim 15, wherein the plurality of LEDs are disposed in a physical array, wherein light from the plurality of LEDs is enabled to be collimated at a Fabry-Perot etalon.

17. The system of claim 16, wherein the physical array is small enough such that the light from each of the plurality of LEDs arrives at the Fabry-Perot etalon traveling in a direction substantially perpendicular to its surface.

18. The system of claim 16, wherein one or more beam splitters are used to combine the light emitted from the plurality of LEDs such that the light from each of the plurality of LEDs arrives at the Fabry-Perot etalon traveling in a direction substantially perpendicular to its surface.

19. A method for spectral reading, comprising:
   disposing a plurality of LEDs in a physical array, wherein light from the plurality of LEDs is enabled to be collimated at a Fabry-Perot etalon;
   receiving a gap calibration table, wherein the gap calibration table includes a set of spectral peak wavelengths associated with a gap of the Fabry-Perot etalon;
   receiving power characteristics of a plurality of LEDs;
   determining, using a processor, an LED switch table, wherein the LED switch table indicates a set of the plurality of LEDs with power above a threshold based at least in part on the power characteristics of the plurality of LEDs;
   causing measurement of a sample using the gap calibration table and the LED switch table for a set of gap values, wherein the LED switch table indicates which LEDs of the plurality of LEDs to switch on associated with a given gap of a Fabry-Perot etalon; and
   determining measurement results.

20. A computer program product for spectral reading, the computer program product being embodied in a non-transitory computer readable storage medium and comprising computer instructions for:
   disposing a plurality of LEDs in a physical array, wherein light from the plurality of LEDs is enabled to be collimated at a Fabry-Perot etalon;
   receiving a gap calibration table, wherein the gap calibration table includes a set of spectral peak wavelengths associated with a gap of the Fabry-Perot etalon;
   receiving power characteristics of a plurality of LEDs;
   determining an LED switch table, wherein the LED switch table indicates a set of the plurality of LEDs with power above a threshold based at least in part on the power characteristics of the plurality of LEDs;
   causing measurement of a sample using the gap calibration table and the LED switch table for a set of gap values, wherein the LED switch table indicates which LEDs of the plurality of LEDs to switch on associated with a given gap of a Fabry-Perot etalon; and determining measurement results.

* * * * *